United States Patent [19]

Beukema et al.

[11] Patent Number: 5,781,763

[45] Date of Patent: Jul. 14, 1998

[54] INDEPENDENT CONTROL OF DMA AND I/O RESOURCES FOR MIXED-ENDIAN COMPUTING SYSTEMS

[75] Inventors: Bruce Leroy Beukema, Hayfield; Gary Scott Delp, Rochester; Larry Wayne Loen, Rochester; Daniel Frank Moertl, Rochester; Michael R. Trombley, Rochester, all of Minn.

[73] Assignee: International Business Machines Corporation, Armonk, N.Y.

[21] Appl. No.: 861,914

[22] Filed: May 22, 1997

Related U.S. Application Data

[63] Continuation of Ser. No. 419,076, Apr. 7, 1995, abandoned.
[51] Int. Cl.[6] .................................................. G06F 13/28
[52] U.S. Cl. ..................................... 395/500; 395/842
[58] Field of Search ........................... 395/412, 189.02, 395/775, 800, 500, 473, 830, 427, 428, 842

[56] References Cited

U.S. PATENT DOCUMENTS

| | | | |
|---|---|---|---|
| 4,959,779 | 9/1990 | Weber et al. | 395/775 |
| 5,448,521 | 9/1995 | Curry et al. | 364/189.02 |
| 5,519,842 | 5/1996 | Atallah et al. | 395/412 |
| 5,526,512 | 6/1996 | Arimilli et al. | 395/473 |
| 5,537,607 | 7/1996 | Ploger, III | 395/830 |

OTHER PUBLICATIONS

Compcon Spring '93 IEEE Computer Society Int'l. Conference, 1993, "A Low-Cost Superscaler PA-RISC Processor", Patrick Knebel et al, pp. 441-447.

IEEE Micro, "Multiplexed Buses: The Endian Wars Continue", David V. James, Jun. 1990, pp. 9-21.

IEEE/IEE Micro, "A Low-cost Graphics and Multimedia Workstation Chip Set", Apr. 1994, vol. 14, Issue 2, pp. 10-22.

Multiplexed Buses: The Endian Wars Continue.

*Primary Examiner*—Gary Chin
*Assistant Examiner*—Dan Fiul
*Attorney, Agent, or Firm*—Owen J. Gamon

[57] ABSTRACT

A mixed-endian computer system enhanced to manage I/O DMA without a software DMA performance penalty. A mixed-endian computer system can change endian mode on a task by task basis if necessary. The mixed-endian system, as enhanced, performs one of two well-defined DMA operations based on control bits either in the DMA control register or in a bit vector associated with each page of processor storage. This invention also describes means for treating I/O registers as if they were of the endian of the executing processor, instead of the more typical need to have the register operate in a particular endian.

9 Claims, 26 Drawing Sheets

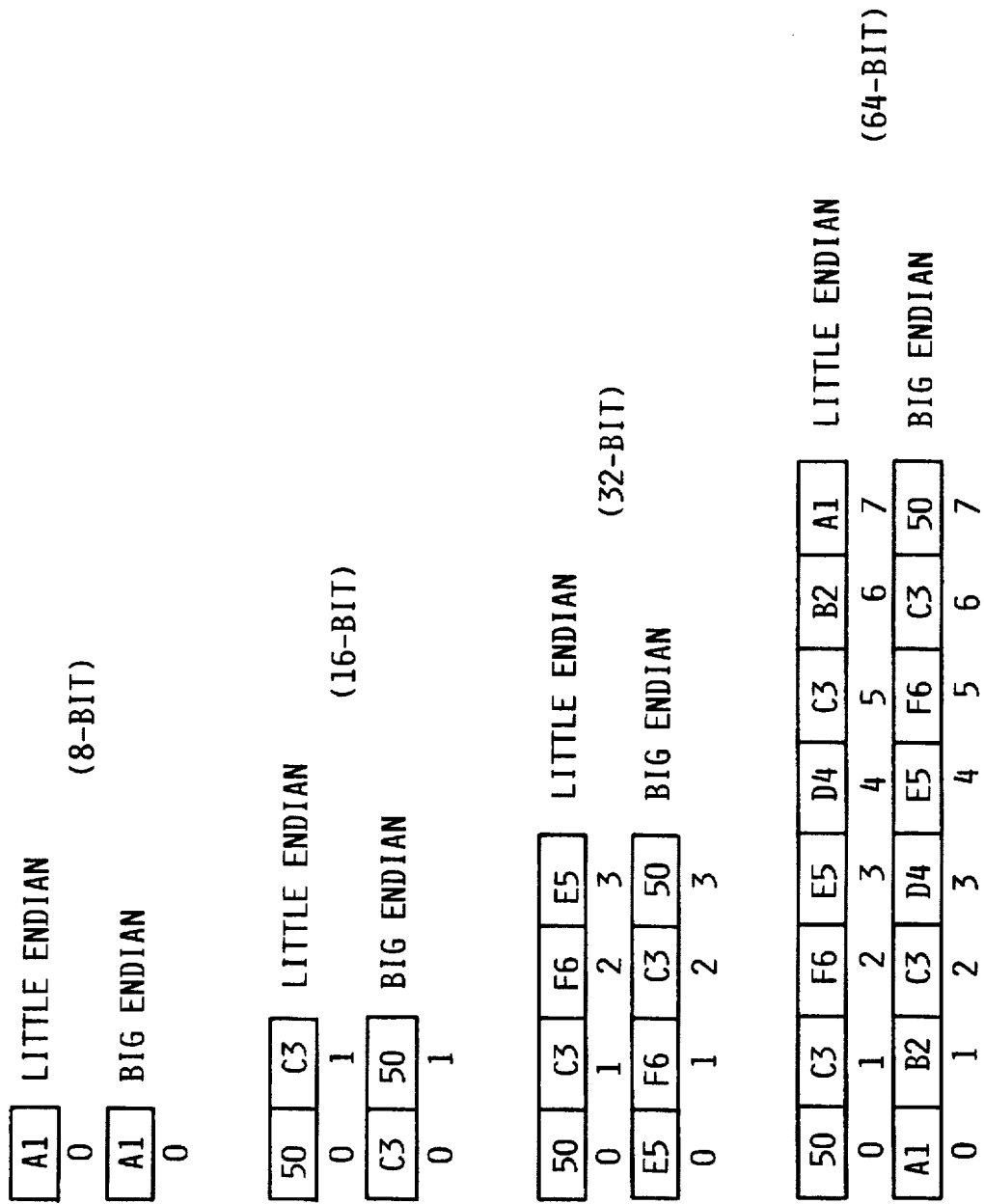

| WORD SIZE | ADDRESS MODIFICATION |
|---|---|
| BYTE (8-BIT) | XOR 7 |
| HALF WORD (16-BIT) | XOR 6 |
| WORD (32-BIT) | XOR 4 |
| DOUBLE WORD (64-BIT) | XOR 0 |

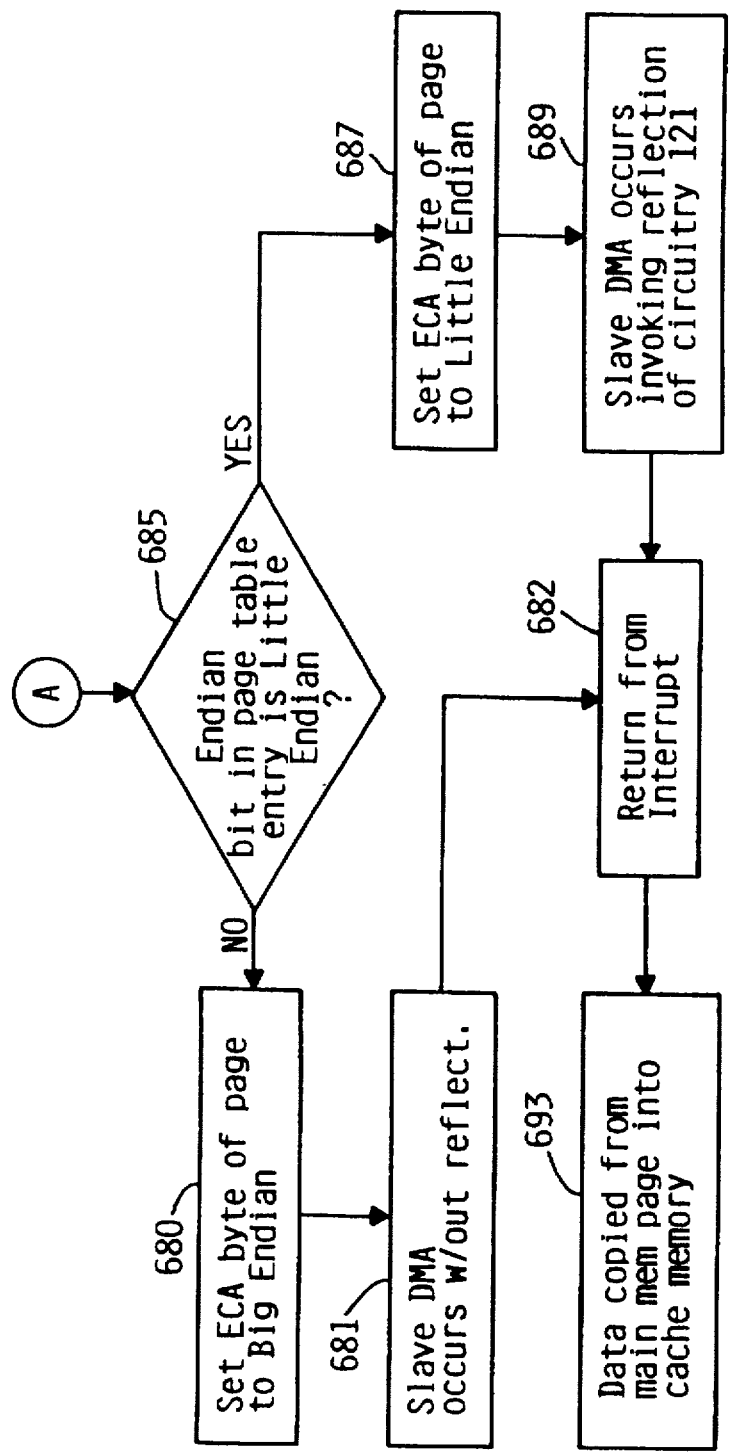
FIG. 6B Slave DMA

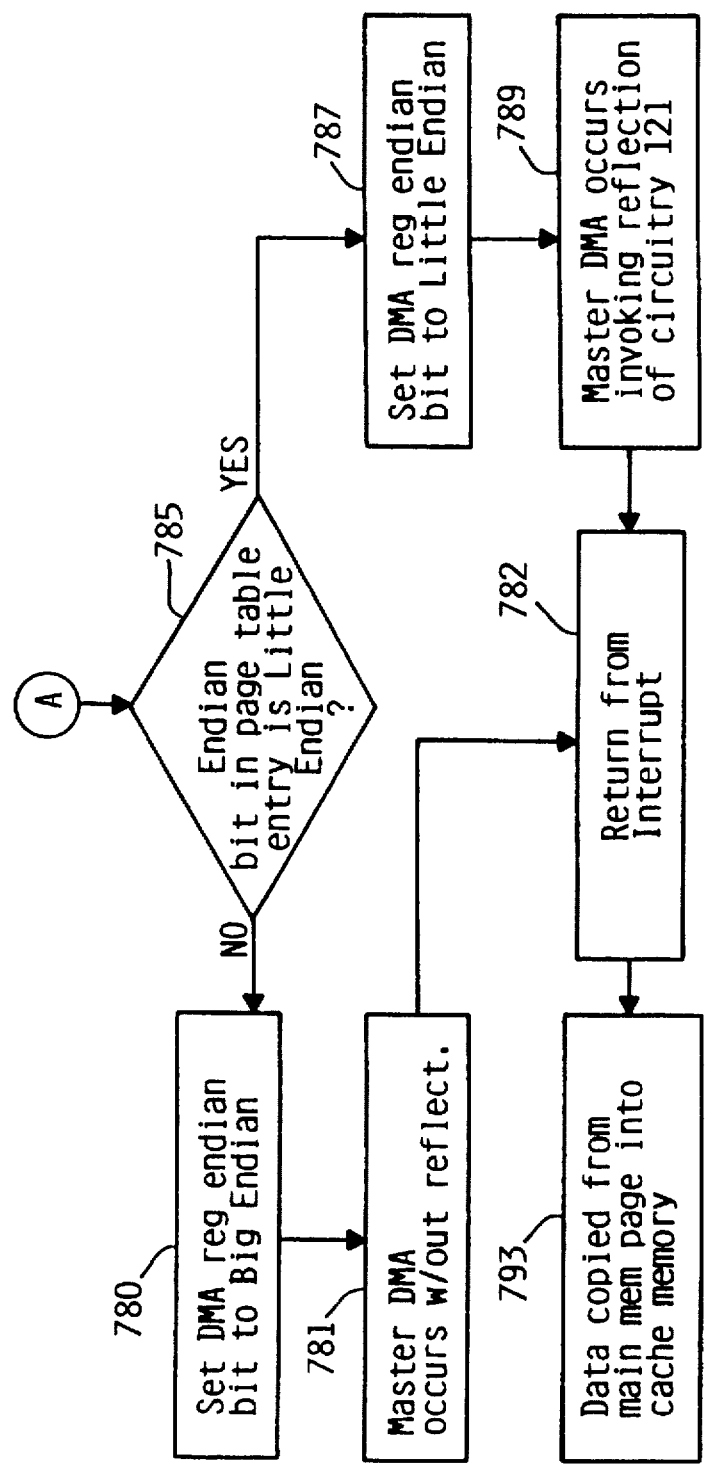
FIG. 7B Master DMA

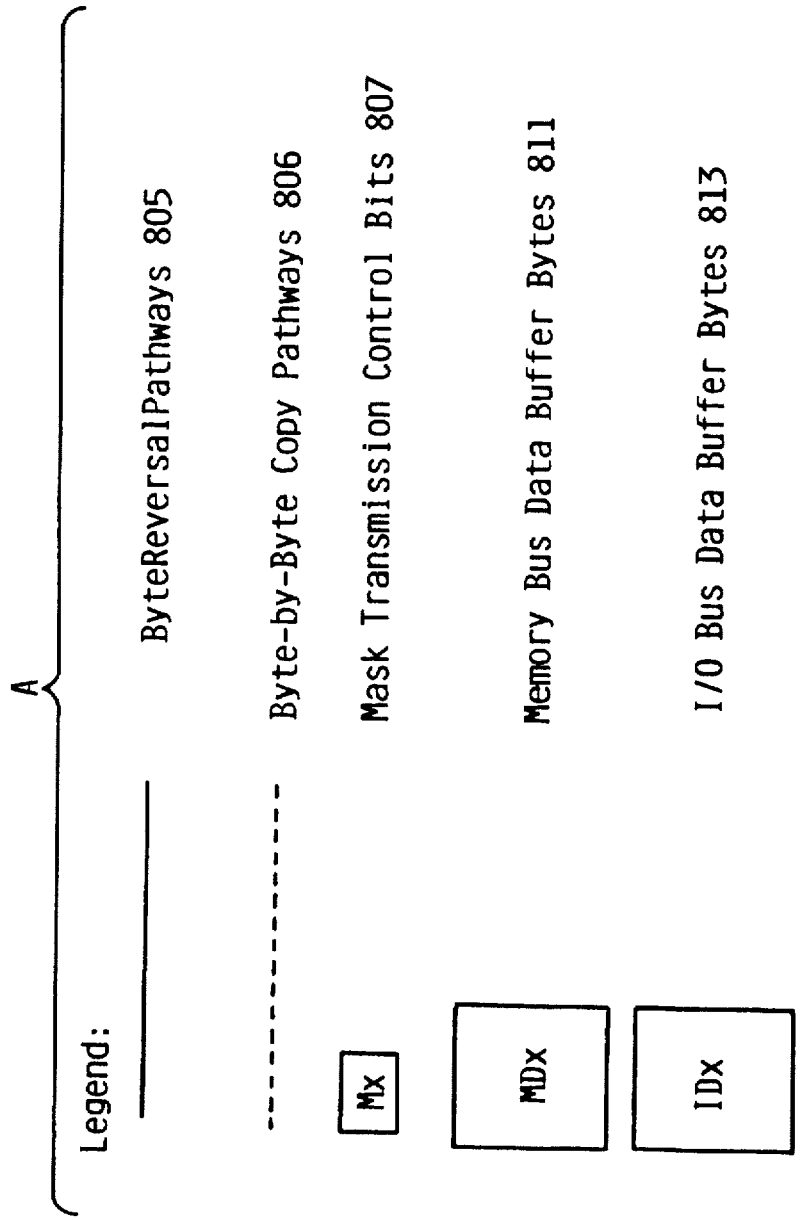
FIG. 8B  DMA with selectable Doubleword Reflection

Settings for Mask Transmission Control Bits of Fig. 8

| Length | Offset | RB | M7 | M6 | M5 | M4 | M3 | M2 | M1 | M0 |
|---|---|---|---|---|---|---|---|---|---|---|
| 8 | 0 | 0 | 1 | 1 | 1 | 1 | 1 | 1 | 1 | 1 |
| 8 | 0 | 1 | 1 | 1 | 1 | 1 | 1 | 1 | 1 | 1 |
| 7 | 0 | 0 | 1 | 1 | 1 | 1 | 1 | 1 | 1 | 0 |
| 7 | 1 | 0 | 0 | 1 | 1 | 1 | 1 | 1 | 1 | 1 |
| 7 | 0 | 1 | 1 | 1 | 1 | 1 | 1 | 1 | 1 | 0 |
| 7 | 1 | 1 | 0 | 1 | 1 | 1 | 1 | 1 | 1 | 1 |
| 6 | 0 | 0 | 1 | 1 | 1 | 1 | 1 | 1 | 0 | 0 |
| 6 | 1 | 0 | 0 | 1 | 1 | 1 | 1 | 1 | 1 | 0 |
| 6 | 2 | 0 | 0 | 0 | 1 | 1 | 1 | 1 | 1 | 1 |
| 6 | 0 | 1 | 1 | 1 | 1 | 1 | 1 | 1 | 0 | 0 |
| 6 | 1 | 1 | 0 | 1 | 1 | 1 | 1 | 1 | 1 | 0 |
| 6 | 2 | 1 | 0 | 0 | 1 | 1 | 1 | 1 | 1 | 1 |
| 5 | 0 | 0 | 1 | 1 | 1 | 1 | 1 | 0 | 0 | 0 |
| 5 | 1 | 0 | 0 | 1 | 1 | 1 | 1 | 1 | 0 | 0 |
| 5 | 2 | 0 | 0 | 0 | 1 | 1 | 1 | 1 | 1 | 0 |
| 5 | 3 | 0 | 0 | 0 | 0 | 1 | 1 | 1 | 1 | 1 |
| 5 | 0 | 1 | 1 | 1 | 1 | 1 | 1 | 0 | 0 | 0 |
| 5 | 1 | 1 | 0 | 1 | 1 | 1 | 1 | 1 | 0 | 0 |
| 5 | 2 | 1 | 0 | 0 | 1 | 1 | 1 | 1 | 1 | 0 |
| 5 | 3 | 1 | 0 | 0 | 0 | 1 | 1 | 1 | 1 | 1 |

| | | A | | | | | | | | | |
|---|---|---|---|---|---|---|---|---|---|---|---|
| 4 | 0 | 0 | 1 | 1 | 1 | 1 | 0 | 0 | 0 | 0 |
| 4 | 1 | 0 | 1 | 1 | 1 | 1 | 1 | 0 | 0 | 0 |
| 4 | 2 | 0 | 0 | 1 | 1 | 1 | 1 | 1 | 0 | 0 |
| 4 | 3 | 0 | 0 | 0 | 1 | 1 | 1 | 1 | 1 | 0 |
| 4 | 4 | 0 | 0 | 0 | 0 | 1 | 1 | 1 | 1 | 1 |
| 4 | 0 | 1 | 1 | 1 | 1 | 0 | 0 | 0 | 0 | 0 |
| 4 | 1 | 1 | 0 | 1 | 1 | 1 | 0 | 0 | 0 | 0 |
| 4 | 2 | 1 | 0 | 0 | 1 | 1 | 1 | 0 | 0 | 0 |
| 4 | 3 | 1 | 0 | 0 | 0 | 1 | 1 | 1 | 0 | 0 |
| 4 | 4 | 1 | 0 | 0 | 0 | 0 | 1 | 1 | 1 | 1 |
| 3 | 0 | 0 | 1 | 1 | 1 | 0 | 0 | 0 | 0 | 0 |
| 3 | 1 | 0 | 1 | 1 | 1 | 1 | 0 | 0 | 0 | 0 |
| 3 | 2 | 0 | 0 | 1 | 1 | 1 | 1 | 0 | 0 | 0 |
| 3 | 3 | 0 | 0 | 0 | 1 | 1 | 1 | 1 | 0 | 0 |
| 3 | 4 | 0 | 0 | 0 | 0 | 1 | 1 | 1 | 1 | 0 |
| 3 | 5 | 0 | 0 | 0 | 0 | 0 | 1 | 1 | 1 | 1 |
| 3 | 0 | 1 | 1 | 1 | 0 | 0 | 0 | 0 | 0 | 0 |
| 3 | 1 | 1 | 0 | 1 | 1 | 0 | 0 | 0 | 0 | 0 |
| 3 | 2 | 1 | 0 | 0 | 1 | 1 | 1 | 0 | 0 | 0 |
| 3 | 3 | 1 | 0 | 0 | 0 | 1 | 1 | 1 | 0 | 0 |
| 3 | 4 | 1 | 0 | 0 | 0 | 0 | 1 | 1 | 1 | 0 |
| 3 | 5 | 1 | 0 | 0 | 0 | 0 | 0 | 1 | 1 | 1 |

FIG. 9A-2

Settings for Mask Transmission Control Bits of Fig. 8

| | | | | | | | | | | |
|---|---|---|---|---|---|---|---|---|---|---|
| 2 | 0 | 0 | 1 | 1 | 0 | 0 | 0 | 0 | 0 | 0 |
| 2 | 1 | 0 | 0 | 1 | 1 | 0 | 0 | 0 | 0 | 0 |
| 2 | 2 | 0 | 0 | 0 | 1 | 1 | 0 | 0 | 0 | 0 |
| 2 | 3 | 0 | 0 | 0 | 0 | 1 | 1 | 0 | 0 | 0 |
| 2 | 4 | 0 | 0 | 0 | 0 | 0 | 1 | 1 | 0 | 0 |
| 2 | 5 | 0 | 0 | 0 | 0 | 0 | 0 | 1 | 1 | 0 |
| 2 | 6 | 0 | 0 | 0 | 0 | 0 | 0 | 0 | 1 | 1 |
| 2 | 0 | 1 | 1 | 1 | 0 | 0 | 0 | 0 | 0 | 0 |
| 2 | 1 | 1 | 0 | 1 | 1 | 0 | 0 | 0 | 0 | 0 |
| 2 | 2 | 1 | 0 | 0 | 1 | 1 | 0 | 0 | 0 | 0 |
| 2 | 3 | 1 | 0 | 0 | 0 | 1 | 1 | 0 | 0 | 0 |
| 2 | 4 | 1 | 0 | 0 | 0 | 0 | 1 | 1 | 0 | 0 |
| 2 | 5 | 1 | 0 | 0 | 0 | 0 | 0 | 1 | 1 | 0 |
| 2 | 6 | 1 | 0 | 0 | 0 | 0 | 0 | 0 | 1 | 1 |
| 1 | 0 | 0 | 1 | 0 | 0 | 0 | 0 | 0 | 0 | 0 |
| 1 | 1 | 0 | 0 | 1 | 0 | 0 | 0 | 0 | 0 | 0 |
| 1 | 2 | 0 | 0 | 0 | 1 | 0 | 0 | 0 | 0 | 0 |
| 1 | 3 | 0 | 0 | 0 | 0 | 1 | 0 | 0 | 0 | 0 |
| 1 | 4 | 0 | 0 | 0 | 0 | 0 | 1 | 0 | 0 | 0 |
| 1 | 5 | 0 | 0 | 0 | 0 | 0 | 0 | 1 | 0 | 0 |
| 1 | 6 | 0 | 0 | 0 | 0 | 0 | 0 | 0 | 1 | 0 |
| 1 | 7 | 0 | 0 | 0 | 0 | 0 | 0 | 0 | 0 | 1 |
| 1 | 0 | 0 | 1 | 0 | 0 | 0 | 0 | 0 | 0 | 0 |
| 1 | 1 | 1 | 0 | 1 | 0 | 0 | 0 | 0 | 0 | 0 |
| 1 | 2 | 1 | 0 | 0 | 1 | 0 | 0 | 0 | 0 | 0 |
| 1 | 3 | 1 | 0 | 0 | 0 | 1 | 0 | 0 | 0 | 0 |
| 1 | 4 | 1 | 0 | 0 | 0 | 0 | 1 | 0 | 0 | 0 |
| 1 | 5 | 1 | 0 | 0 | 0 | 0 | 0 | 1 | 0 | 0 |
| 1 | 6 | 1 | 0 | 0 | 0 | 0 | 0 | 0 | 1 | 0 |
| 1 | 7 | 1 | 0 | 0 | 0 | 0 | 0 | 0 | 0 | 1 |

FIG. 9B

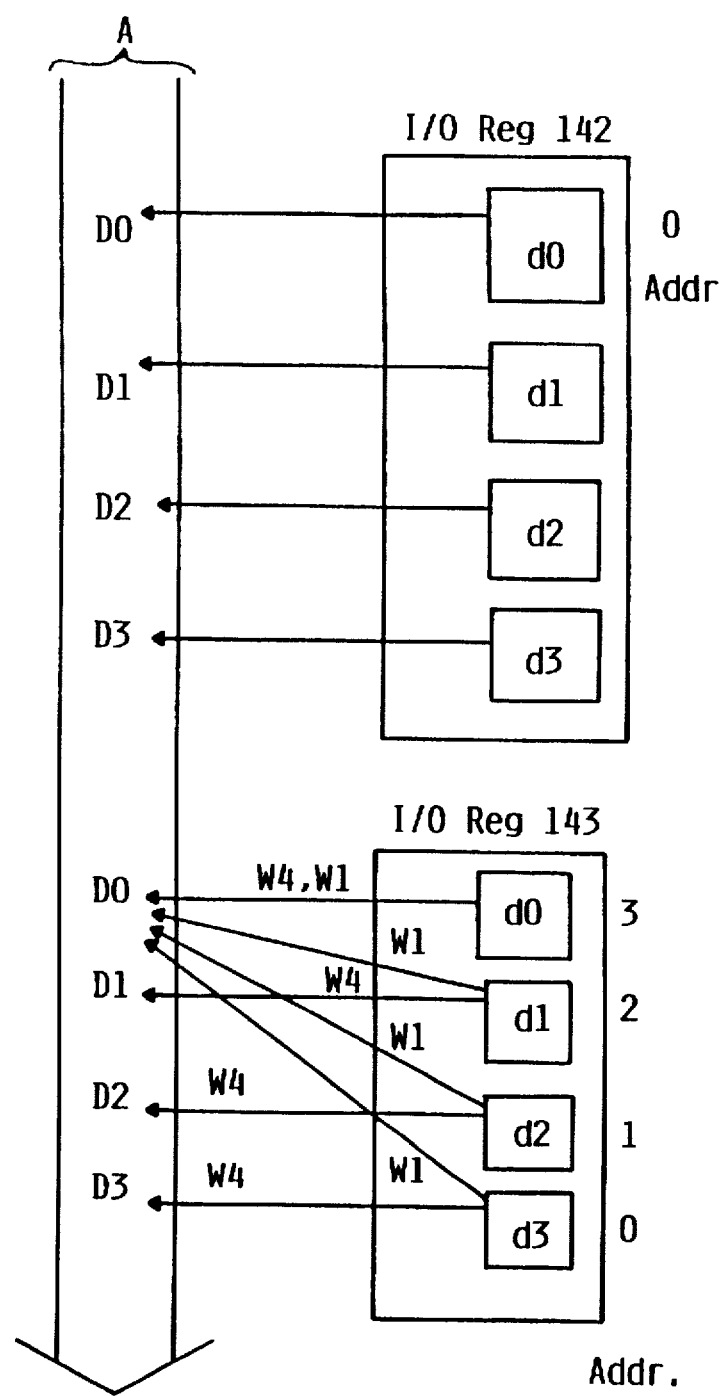
FIG. IOB

FIG. 11A

"Addr."

LE=0, W1=1

| | 0 PD7 | 1 PD6 | 2 PD5 | 3 PD4 | 4 PD3 | 5 PD2 | 6 PD1 | 7 PD0 |
|---|---|---|---|---|---|---|---|---|
| A2..A0=0 | D0 | x | x | x | x | x | x | x |
| A2..A0=1 | x | D0 | x | x | x | x | x | x |
| A2..A0=2 | x | x | D0 | x | x | x | x | x |
| A2..A0=3 | x | x | x | D0 | x | x | x | x |
| A2..A0=4 | x | x | x | x | D0 | x | x | x |
| A2..A0=5 | x | x | x | x | x | D0 | x | x |
| A2..A0=6 | x | x | x | x | x | x | D0 | x |
| A2..A0=7 | x | x | x | x | x | x | x | D0 |

LE=0, W2=1

| | 0 PD7 | 1 PD6 | 2 PD5 | 3 PD4 | 4 PD3 | 5 PD2 | 6 PD1 | 7 PD0 |
|---|---|---|---|---|---|---|---|---|
| A2..A0=0 | D1 | D0 | x | x | x | x | x | x |
| A2..A0=2 | x | x | D1 | D0 | x | x | x | x |
| A2..A0=4 | x | x | x | x | D1 | D0 | x | x |
| A2..A0=6 | x | x | x | x | x | x | D1 | D0 |

LE=0, W4=1

| | 0 PD7 | 1 PD6 | 2 PD5 | 3 PD4 | 4 PD3 | 5 PD2 | 6 PD1 | 7 PD0 |
|---|---|---|---|---|---|---|---|---|
| A2..A0=0 | D3 | D2 | D1 | D0 | x | x | x | x |
| A2..A0=4 | x | x | x | x | D3 | D2 | D1 | D0 |

LE=0, W8=1

| | 0 PD7 | 1 PD6 | 2 PD5 | 3 PD4 | 4 PD3 | 5 PD2 | 6 PD1 | 7 PD0 |
|---|---|---|---|---|---|---|---|---|
| A2..A0=0 | D7 | D6 | D5 | D4 | D3 | D2 | D1 | D0 |

} A

Note: W8 = (Not W4) & (Not W2) & (Not W1)
"x" in above tables means byte is ignored on fetch For reference, big endian value of Fig 2B would be set as follows:
PD7= A1, PD6=B2, PD5=C3, PD4=D4, PD3=E5, PD2=F6, PD1=C3, PD0=50

Byte Steering performed on fetch by circuitry 136,
big endian case

FIG. 11B

| "Addr." LE=1,W1=1 | 0 PD7 | 1 PD6 | 2 PD5 | 3 PD4 | 4 PD3 | 5 PD2 | 6 PD1 | 7 PD0 |
|---|---|---|---|---|---|---|---|---|
| A2..A0=0 | x | x | x | x | x | x | x | D0 |
| A2..A0=1 | x | x | x | x | x | x | D0 | x |
| A2..A0=2 | x | x | x | x | x | D0 | x | x |
| A2..A0=3 | x | x | x | x | D0 | x | x | x |
| A2..A0=4 | x | x | x | D0 | x | x | x | x |
| A2..A0=5 | x | x | D0 | x | x | x | x | x |
| A2..A0=6 | x | D0 | x | x | x | x | x | x |
| A2..A0=7 | D0 | x | x | x | x | x | x | x |

| "Addr." Le=1, W2=1 | 0 PD7 | 1 PD6 | 2 PD5 | 3 PD4 | 4 PD3 | 5 PD2 | 6 PD1 | 7 PD0 |
|---|---|---|---|---|---|---|---|---|
| A2..A0=0 | x | x | x | x | x | x | D1 | D0 |
| A2..A0=2 | x | x | x | x | D1 | D0 | x | x |
| A2..A0=4 | x | x | D1 | D0 | x | x | x | x |
| A2..A0=6 | D1 | D0 | x | x | x | x | x | x |

| "Addr." LE=1, W4=1 | 0 PD7 | 1 PD6 | 2 PD5 | 3 PD4 | 4 PD3 | 5 PD2 | 6 PD1 | 7 PD0 |
|---|---|---|---|---|---|---|---|---|
| A2..A0=0 | x | x | x | x | D3 | D2 | D1 | D0 |
| A2..A0=4 | D3 | D2 | D1 | D0 | x | x | x | x |

| "Addr." LE=1, W8=1 | 0 PD7 | 1 PD6 | 2 PD5 | 3 PD4 | 4 PD3 | 5 PD2 | 6 PD1 | 7 PD0 |
|---|---|---|---|---|---|---|---|---|
| A2..A0=0 | D7 | D6 | D5 | D4 | D3 | D2 | D1 | D0 |

Note: W8 = (Not W4) & (Not W2) & (Not W1)
"x" in above tables means byte is ignored on fetch Byte Steering performed on fetch by circuitry 136, little endian case

FIG. 12

INDEPENDENT CONTROL OF DMA AND I/O RESOURCES FOR MIXED-ENDIAN COMPUTING SYSTEMS

This is a continuation of application Ser. No. 08/419,076, filed Apr. 7, 1995, now abandoned.

FIELD OF THE INVENTION

The present invention pertains generally to the field of data processing and more particularly to the field of endian oriented computer systems.

BACKGROUND OF THE INVENTION

The earliest digital computers built in the late 1940's had simple designs and components. Despite numerous advances in technology over the years, most modern day computers still use the same basic components to perform the same fundamental tasks of storing and manipulating information.

Two of these basic components are computer memory and a processor. Computer memory stores information being used by the computer and works in much the same way as the memory of a person. For example, just as people can remember ideas about different topics and events, the memory of a computer system can be used to store words, numbers, pictures, and other forms of information.

A computer processor is the active component of the computer system. The processor operates on the information stored in the computer system's memory to carry out the tasks assigned to the computer system. The tasks being processed by the computer system are also sometimes called jobs, programs, or processes.

A computer processor running a job reads and processes information stored in computer memory in much the same way a person reads and processes the words printed on the page of a book. Therefore, just as the arrangement of words on a page is important to human readers, the arrangement of information in the computer system's memory is important to the computer system. For example, words in English are written from left to right and words in Hebrew are written from right to left. People who read only English are able to understand English words that are written from left to right while people who read only Hebrew are able to understand Hebrew words that are written from right to left. The fact that English words are written on a page from left to right does not mean that it is better to arrange words in this manner instead of arranging them from right to left. English words are written from left to right simply because English readers expect words to be written from left to right. In this sense, the arrangement of information in the memory of a computer system is not different than the arrangement of words on a page. One way of arranging the information is not inherently better than any other way of arranging the information. However, computer systems are also just like people in the sense that if the information is not arranged in a way that the computer system expects, the information cannot be understood by the computer system.

Of course, the fact that one way of arranging computer system information is not better than any other way of arranging the information has provided the opportunity for different approaches to organizing information in computer system memory. It is no surprise, then, that computer system designers would at some point develop different schemes for organizing at least some forms of computer system information. One such divergence occurred some time ago for two particular forms of computer system information (called floating point information and binary integer information). At present, there are two common schemes for arranging these types of computer system information. The two schemes were dubbed "little endian" and "big endian" after the warring tribes from the famous book *Gulliver's Travels* written by Jonathan Swift. While the terms are colorful, they have no significance to computer systems beyond denoting how these types of information are arranged on a particular computer system.

In the late 1970's and early 1980's, Intel Corporation introduced processors that became the standard for IBM PC and compatible personal computers. These computer systems used the so-called little endian arrangement. During this same time, other computer systems were designed using the so-called big endian arrangement. These later computer systems included processors manufactured by Motorola Corporation and used in computer systems manufactured by Apple Corporation.

In the past, the way computer systems organized information (in big or little endian format) within their memory was not a significant problem because it was not considered advantageous to arrange information in more than one way on a single computer system.

Today, however, the tremendous growth of computers used in businesses and homes has given rise to a serious need for compatibility between the different types of computer systems. For example, persons who use the IBM PC or compatible computers find it difficult to share computer programs and information with persons who use Apple Macintosh computers, and vice versa. Large companies that use both types of computers find it difficult to distribute information to employees. Small businesses often find it difficult to share information with suppliers or buyers who do not have the same type of computers. Consequently, computer software developers are often forced to devote additional time and resources to develop multiple versions of the same software so as to support different types of computer systems. In short, the inability to arrange certain types of information in more than one way on a single computer system has in large part resulted in delayed products, lost productivity, reduced efficiency, and increased capital expenditures.

Some existing computer systems do attempt to deal with the endian problem, but only in a limited fashion. These computer systems have what can be referred to as bi-endian capability. Essentially, bi-endian capability means that the same computer system can be made to execute either big endian tasks or little endian tasks, but not both types of tasks together. In other words, when the computer system is first started, the computer system is told whether it will be running big endian or little endian tasks (i.e., the computer system can be made to run in either big endian mode or little endian mode). Switching an existing bi-endian computer system's endian mode (i.e., big endian mode to little endian mode or vise versa) requires special purpose software that executes very early in the computer's initialization cycle (i.e., very close to start-up). Thereafter, all tasks will execute in the specified endian. For practical purposes, then, bi-endian computer systems are really equivalent to regular, "mono-endian," computer systems once they have completed their boot process.

Copending U.S. patent application Ser. No. 08/393,968 entitled "A Mixed-Endian Computing Environment for a Conventional Bi-Endian Computer System", the disclosure of which is hereby incorporated by reference, taught how to enhance a bi-endian machine to provide what will be referred to as a "Mixed Endian Computer System". A Mixed Endian Computer System has the ability to intermix tasks of either endian and execute them task-by-task, dynamically changing the endian of the processor state according to the current task of interest.

However, this Mixed Endian Computer System does not have efficient DMAs (Direct Memory Accesses) because, one endian mode or the other had an "I/O bias"; that is, a performance advantage. This bias relates to which endian, after an ordinary byte-by-byte DMA, must perform software double word reflection after I/O Read DMAs (data in from the device to main storage) or before I/O Write DMAs (data out from main storage to the device).

The endian performing this added overhead can be called the "disfavored" endian. The "disfavor" arises as a consequence of a two-step simulation of one of the two endians, described below. Because which endian was disfavored can be selected in a Mixed Endian Computer System, software processing of the disfavored endian might be satisfactory, especially when the disfavored endian accounted for a sufficiently small percentage of the total I/O DMA traffic. However, in some environments (especially if the ratio of "favored" to "disfavored" endian approaches a 50—50 split), the overhead for a "disfavored" endian could be intolerable compared to the cost in hardware of alleviating the performance drag of the aforementioned software double word reflection processing of the DMAs.

SUMMARY OF THE INVENTION

It is a principal object of this invention to provide an enhancement to Mixed Endian Computer Systems such that the DMA operations operate without any performance favoritism to either endian.

It is yet another object of this invention to perform DMA operations without any performance favoritism to either endian such that the processor's data format requirements are supported without modification.

It is still another object of this invention to provide control structures to select the required doubleword reflection function in hardware DMA pathways, and apply doubleword reflection hardware to both master DMA and slave DMA.

It is a further object of this invention to provide that the control structures can be applied so that data can flow through the system in an I/O bus, under master DMA control rules, without any data reformatting.

It is a different object of this invention to provide a means by which I/O registers of known, fixed integer widths may be accessed successfully regardless of the endian of the running task.

The present invention operates in a processor architecture, called a Mixed Endian Computer System, that is capable of running tasks of either endian and changing on a task-by-task basis. This invention eliminates the performance penalties in the I/O subsystem of the prior art or such a Mixed Endian Computer System. In the mixed endian environment of the preferred embodiment, mechanisms are described that enable data to be delivered to tasks running in either endian in the format required by the processor to correctly interpret the data in the expected endian required by a given task. Those means include a doubleword reflection whereby data in little endian format has its doublewords or portions thereof reflected in main storage as part of a two step little endian simulation. Since the data flows in and out of the system on I/O, the DMA pathway is an ideal location to perform this doubleword reflection, which, in the Mixed Endian Computer System, must take place using software subroutines. In many computer systems, the added overhead of software doubleword reflections could be a significant burden on the processor, taking resources away from other uses of the facilities and reducing processor capacity to address said other uses. Thus, the present invention enables the desired mixed endian environment, but eliminates the software overhead of performing the doubleword reflection in software to pre- or post-process an ordinary, conventional byte-by-byte DMA operation.

In addition, the present invention discloses a means for I/O registers to be operated in a manner independent of the current endian of the processor. This gives the advantage of being able to treat I/O register resources as multi byte integers without consideration of the endian defined by the designer of the I/O register resource being the same or different from that of the processor.

BRIEF DESCRIPTION OF THE DRAWINGS

FIG. 2b shows the big endian and little endian data formats of the prior art.

FIGS. 9a & 9b show a single table (arbitrarily divided over two figures) representing mask bit values for various storage offsets, lengths, and reflection bit values to control either fetch or store of DMA or processor operations in the preferred embodiment.

FIGS. 11 and 12 show, in table form, the byte steering operations of the preferred embodiment.

DESCRIPTION OF THE PREFERRED EMBODIMENT

Overview and Background

As previously discussed, the present invention pertains to the storage and use of big and little endian information on a single computer system. More specifically, the preferred embodiment operates in a Mixed Endian Computer System that allows tasks, having different endian expectations (i.e., either big or little) to not only co-exist on a single computer system, but to execute, task for task, on a single computer system. This preferred embodiment enhances the Mixed Endian Computer System to avoid any I/O penalties in the I/O DMA pathways.

A basic overview of the execution environment is presented here so that the reader can fully appreciate the benefits and advantages of the present invention. A more detailed description of the inner-workings of this invention can be found in the Detailed Description section of this specification.

As shown in FIG. 2b, the big endian data format involves storing the most significant byte of the word at the lowest memory address, the next most significant at the lowest plus 1, and so on. For example, a 32-bit integer representing a decimal value of 50,000 is stored in hexadecimal in ascending bytes in big endian format as 0000C350, where address offset 0 is 00 and offset 3 is 50. In contrast, the little endian format involves storing the least significant byte is stored at the lowest memory address, the next least significant at the lowest plus 1, and so on. For example, a 32-bit integer representing a decimal value of 50,000 is stored in hexadecimal in ascending bytes in little endian format as 50C30000, where address offset 0 is 50 and offset 3 is 00.

As is known in the art, it is impracticable to perform a general conversion between big and little endian because binary numbers of differing sizes may appear anywhere within memory, and most software applications define data structures with binary numbers and character strings of varying sizes. Thus, only the applications defining such data structures know how to interpret them and thus only they could change the data from one endian to another. Some applications may do so; most will not; they simply require the environment of their own endian to be provided. Mixed endian computer systems provide solutions for coexistence of both kinds of programs and data (big and little endian) to coexist on the same machine, as well as providing models that enable sharing of data between tasks of differing endians.

Figure 2A:
FIG. 2a shows the data word sizes used in the prior art IBM PowerPC architecture.

For the purpose of illustration, a 32-bit word size is used throughout this overview, and corresponding portions of words are shown in FIG. 2a. It will be recognized, however, that computer systems utilizing other word sizes, such as 16-bit and 64-bit, may be used with the present invention without loss of generality.

As discussed above, some computer systems, called bi-endian computer systems, are able to change their external endian mode. Internally, however, a bi-endian computer system can be viewed as a computer system that is biased toward one particular endian, while at the same time including circuitry that provides the alternative endian mode. This circuitry is initialized by special purpose software to control the endian mode of the computer system. When the circuitry is initialized to operate in the alternative endian mode, reflection of the data takes place. The need for reflection is simply a consequence of how the bi-endian computer system handles the difference between big and little endian data formats. Therefore, once a bi-endian computer system is up and running, reflection either always occurs or never occurs, depending of course on whether the computer system has been told to run in its alternative endian mode.

The Mixed Endian Computer System can be viewed the same way. It is enhanced so that the endian mode may be changed at any time, instead of just at one time, early in initialization. However, the system may still be viewed as having an internal endian bias toward one endian or another and still perform reflection operations for the alternative endian. The difference from the bi-endian system is that the Mixed Endian Computer System can change from one endian mode to the other in a controlled fashion at any time it wishes and intermix tasks of either endian in an advantageous manner.

The preferred processor of the present invention is an enhanced IBM PowerPC processor, which is described in *The PowerPC Architecture: A Specification for a New Family of RISC Processors*, May 1994, IBM Corporation, Pub. No. SR28-5124-01 (hereinafter *The PowerPC Architecture*), which is hereby incorporated by reference. The mixed endian and bi-endian processors of the PowerPC (e.g., the Model 620) family are biased toward big endian, so they handle little endian tasks via a two step process. The first step is the aforementioned doubleword reflection ("reflection", without qualification, refers to the "doubleword reflection" of FIG. 3a unless stated otherwise). The reflection step essentially rearranges the data such that it can be accessed correctly given the big endian bias of the processors. The second step, called address modification, converts the addresses used to reference the data from big endian addresses to little endian addresses. While a PowerPC mixed endian processor has been chosen for the preferred embodiment, the present invention is not limited to any particular mixed endian or bi-endian processor, and the present invention is not limited to any particular endian bias. For example, the present invention applies equally to any bi-endian or mixed endian processor that, because of a little endian bias, handles big endian tasks through some type of reflection and address modification. In fact, if a mono-endian processor wishes to format its main storage in reflected form, the present invention can apply to such an environment.

As discussed above, there are two possible endian situations that exist when running in a mixed-endian processing environment. The first possibility is where the internal endian of the processor matches that of the software task. In this case, no conversion of software data is required, since the data byte order and data address offset can be read directly by the processor. The second possibility is where the internal endian of the processor does not match that of the software task. In this latter case, the aforementioned two-step process is used within PowerPC computer systems. These steps are illustrated in the tables shown as FIGS. 3a and 3b. The first step is a reflection that must be performed on the bytes comprising the data double word or fragment thereof (see FIG. 3a). The second step is a modification of the memory address offset of the bytes comprising the data double word to accommodate the new location of the bytes after the reflection that was performed in the first step (see FIG. 3b).

The reflection step may be performed in a variety of places, and is entirely mechanical and unrelated to the data element size being fetched. The reflection starts from storage that is presumed to be in the true endian format of the alternative endian and is then reflected. The reflection is based on its relative offset within a virtual addressed page.

a real addressed page, or an associated cache line as an aligned double word or as a well-defined fragment thereof, as part of the fetch or store along the fetch/store data pathway prior to the second step of address modification. Referring to the table shown in FIG. 3a, byte 0 is exchanged with byte 7, byte 1 is exchanged with byte 6, byte 2 is exchanged with byte 5, and byte 3 is exchanged with byte 4. The result is that storage has now been changed from one endian to the other, but is residing at a different offset than expected by the programmer. It will be recognized that other reflections for word sizes other than 64-bits may be performed with the present invention without loss of generality. Since the reflection is a symmetric operation, it can also be performed when the data is presumed to be in its doubleword reflected form and desired to be rendered in its true form.

Figures 3A, 3B:
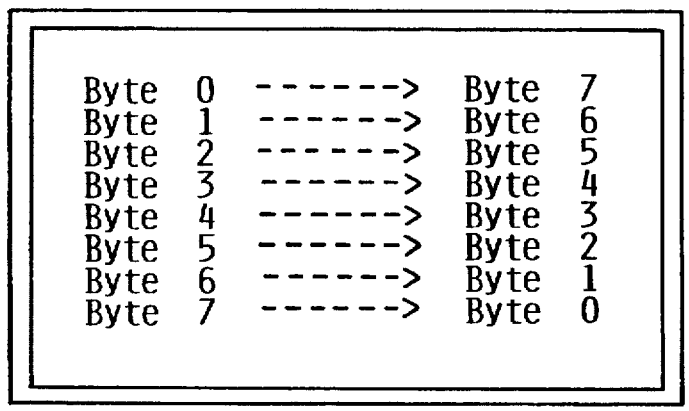
FIG. 3a shows how data is reflected in the prior art IBM PowerPC architecture.
FIG. 3b shows how little endian addresses are modified in the prior art IBM PowerPC architecture.

The second step performs an address modification that depends on the size of the data word that is being referenced by the processor. Referring to FIG. 3b, a preferred system performs an Exclusive-or (XOR) 7 operation during a 8-bit byte memory reference, an XOR 6 operation during a 16-bit half word memory reference, an XOR 4 operation during a 32-bit word memory reference, and an XOR 0 operation during a 64-bit memory reference.

After the second step is completed, a program executing in a mono endian environment cannot tell that it is operating in a two step simulation. The results the program can observe are identical to operating the same program on a mono endian processor agreeing with the endian assumption the program was compiled to execute on.

Other processors of varying word widths can be accommodated by this approach by those skilled in the art. Thus, while the two step process herein relates to prior art associated with a two-step endian simulation built around a doubleword and the doubleword reflection, it is to be understood that the invention also applies to other data widths than 64 bits and that arbitrary integer sizes (not just the 8, 16, 32, and 64 bit sizes shown) may likewise be accommodated.

FIGS. 4a, 4b, 4c, and 4d show the two step little endian simulation process for a processor with a big endian internal data flow for the data structure "x" where "x" has a data type of "demo" and data values as illustrated in the following C programming language code:

```
typedef struct {
    INT 32 word;    /* a 32 bit integer */
    INT 16 hword;   /* a 16 bit integer */
    BYTE byte;      /* a single byte */
    BYTE end;       /* another byte */
} demo;
demo x;
x.word = 0x0000C350;
x.hword = 0x1F2;
x.byte = 0xA1;
x.end = 0x00;
```

Figure 4A:
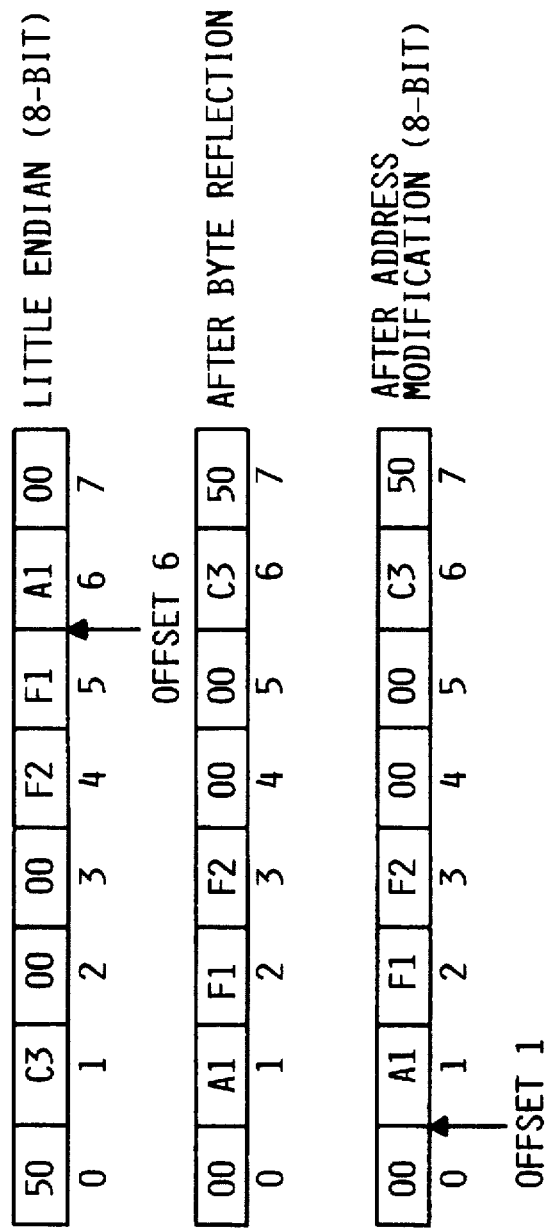
FIG. 4a shows how an 8-bit data item is fetched via the two-step little endian simulation process used in bi-endian and mixed endian prior art PowerPC computer systems.
Figure 4B:
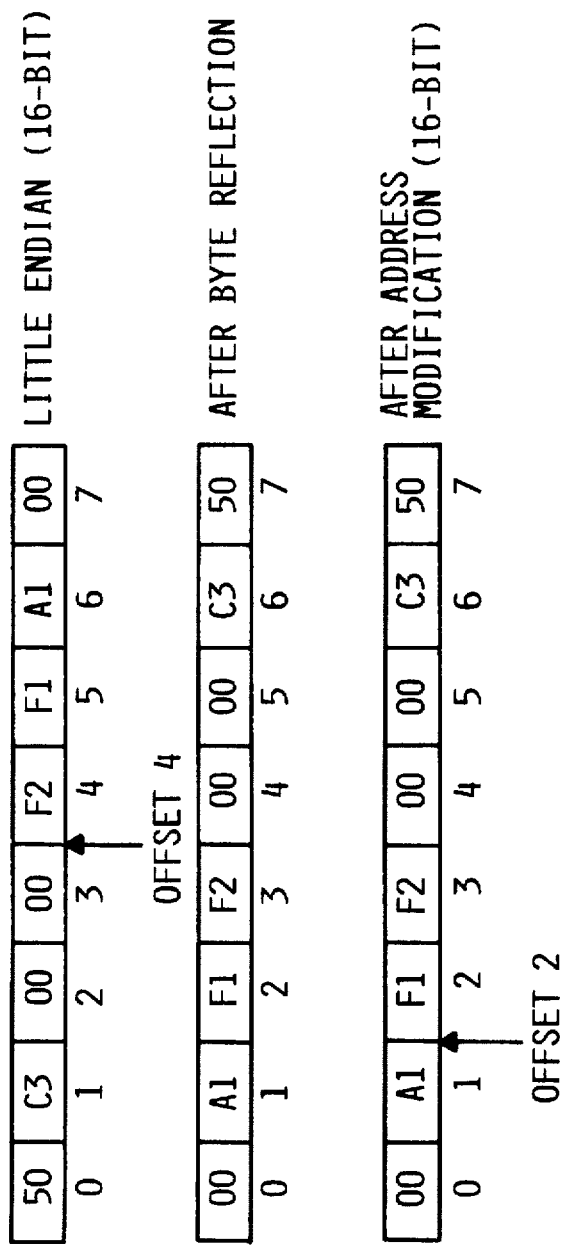
FIG. 4b shows how an aligned 16-bit data item is fetched via the two-step little endian simulation process used in bi-endian and mixed endian prior art PowerPC computer systems.
Figure 4C:
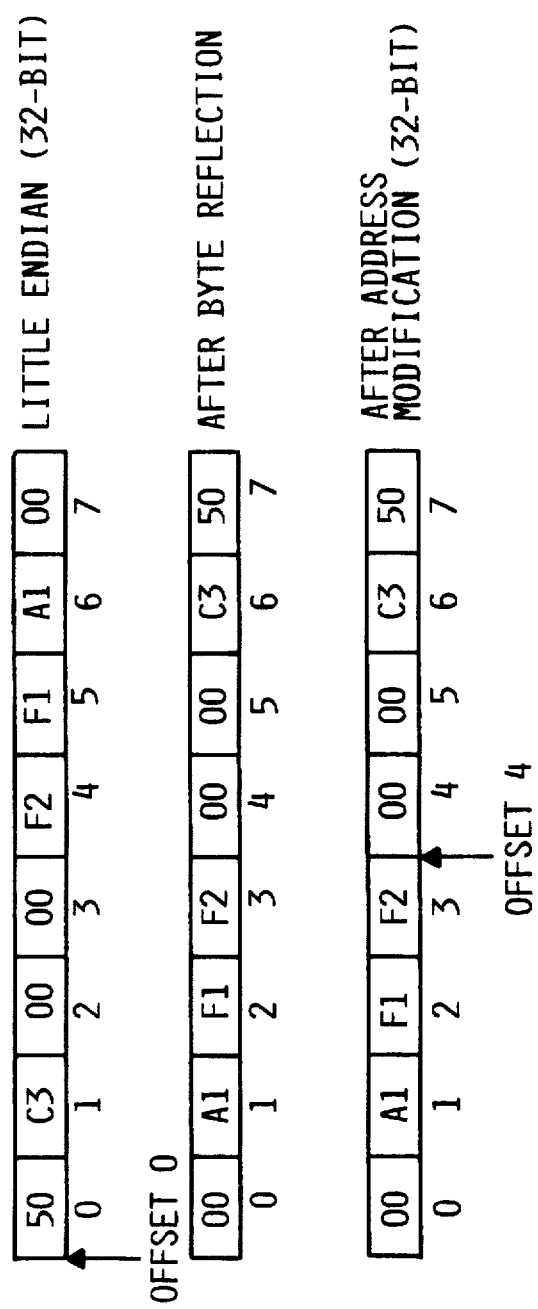
FIG. 4c shows how an aligned 32-bit data item is fetched via the two-step little endian simulation process used in bi-endian and mixed endian prior art PowerPC computer systems.
Figure 4D:
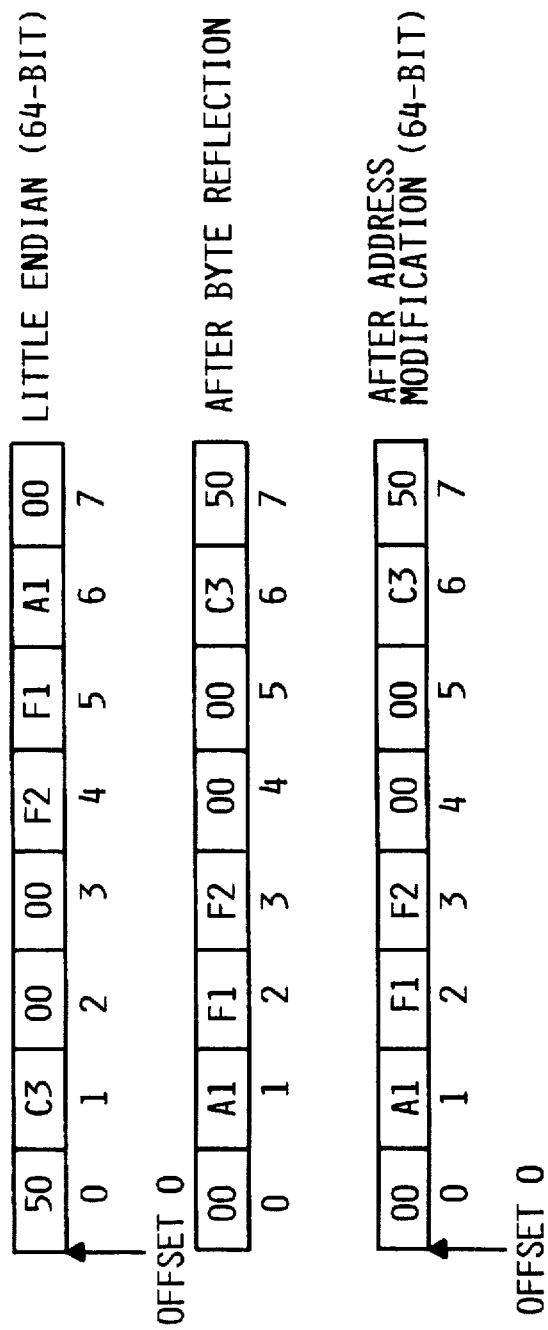
FIG. 4d shows how an aligned 64-bit data item is fetched via the two-step little endian simulation process used in bi-endian and mixed endian prior art PowerPC computer systems.

For example, in FIG. 4c, the 32-bit "x.word" is shown reflected from little endian format to big endian format and its location has changed from offset 0 to offset 4 during a 32-bit word fetch. The offset must be modified because the processor has the capability to fetch structures of multiple sizes into a register of a single size, which in this example is 64 bits. To complete the processor fetch from memory, an address modification is performed on the address as originally presented by the software. In this case, the fetch of a 32-bit word, the original address has an offset of 0. The processor takes the presented address and performs an XOR 4, which fetches the corresponding big endian word from offset 4. It will be recognized that by performing an XOR 7 for 8-bit byte memory reference, an XOR 6 operation during a 16-bit half word memory reference, an XOR 4 operation during a 32-bit word memory reference, and an XOR 0 operation during a 64-bit memory reference, that storage that began in little endian format before the first step and is first reflected as described above, corrects the original offset from what the original software specified to an internally correct offset to account for the reflection. Since these steps are hidden by PowerPC computer systems, a programmer cannot tell that the environment is anything other than true little endian. Additional examples of the two-step conversion process from little endian to big endian format, corresponding to 8-bit "x.byte", 16-bit "x.hword", and 64-bit "x" memory references, are given in FIGS. 4a, 4b, and 4d, respectively.

Figure 5:
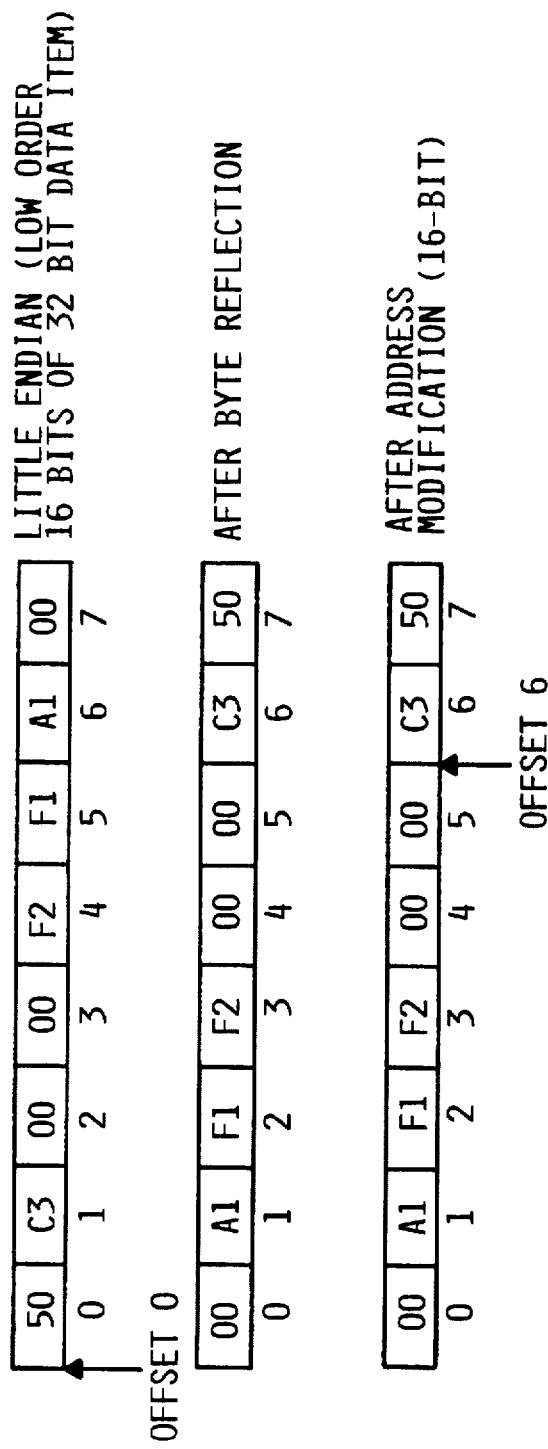
FIG. 5 shows how the low order 16 bits of a 32-bit little endian integer may be fetched via the prior art two-step little endian process used in bi-endian and mixed endian PowerPC computer systems.

The PowerPC two-step conversion process described above also accommodates partial data reads. For example, FIG. 5 shows a fetch of the low order 16 bits, C3 50, of the 32-bit integer "x.word" having the value: 00 00 C3 50. Because the 32-bit integer is little endian, the software normally fetches the halfword at offset 0, using standard little endian rules. The 16-bit memory reference of the 32-bit word is accommodated by first reflecting the 32-bit word from little endian format to big endian format, as previously described in FIG. 4c. Because the current memory reference is for a 16-bit value, an XOR 6 is then performed as described in FIG. 3b, which fetches the correct big endian halfword from offset 6.

The Mixed Endian Computer System tracks and determines which data pages in main storage must be in reflected form (as the first step of a two-step simulation) and which are to be in the same form in main storage as read in from the media.

The questions of interest to the present invention relate to the following issues:

1) The fact that in many embodiments, the I/O subsystem (software and hardware) collectively must cause a doubleword reflection to take place.

2) The fact that some embodiments would prefer that any reflection required is overlapped as part of the DMA operation that already is known to be performed and so it is both possible and desirable to do the reflection in the hardware DMA pathways.

Note that the reflection is visible largely to I/O DMA logic. A program running only in little endian and executed by the PowerPC little endian simulation will, as previously described, be unable to know a two-step process is occurring. However, this is not true of the I/O DMA pathways, since its view of main storage sees only the first of the two steps. Thus, the I/O DMA pathway must account for the need to do, or not to do, doubleword reflection.

Detailed Description

Figure 1A:
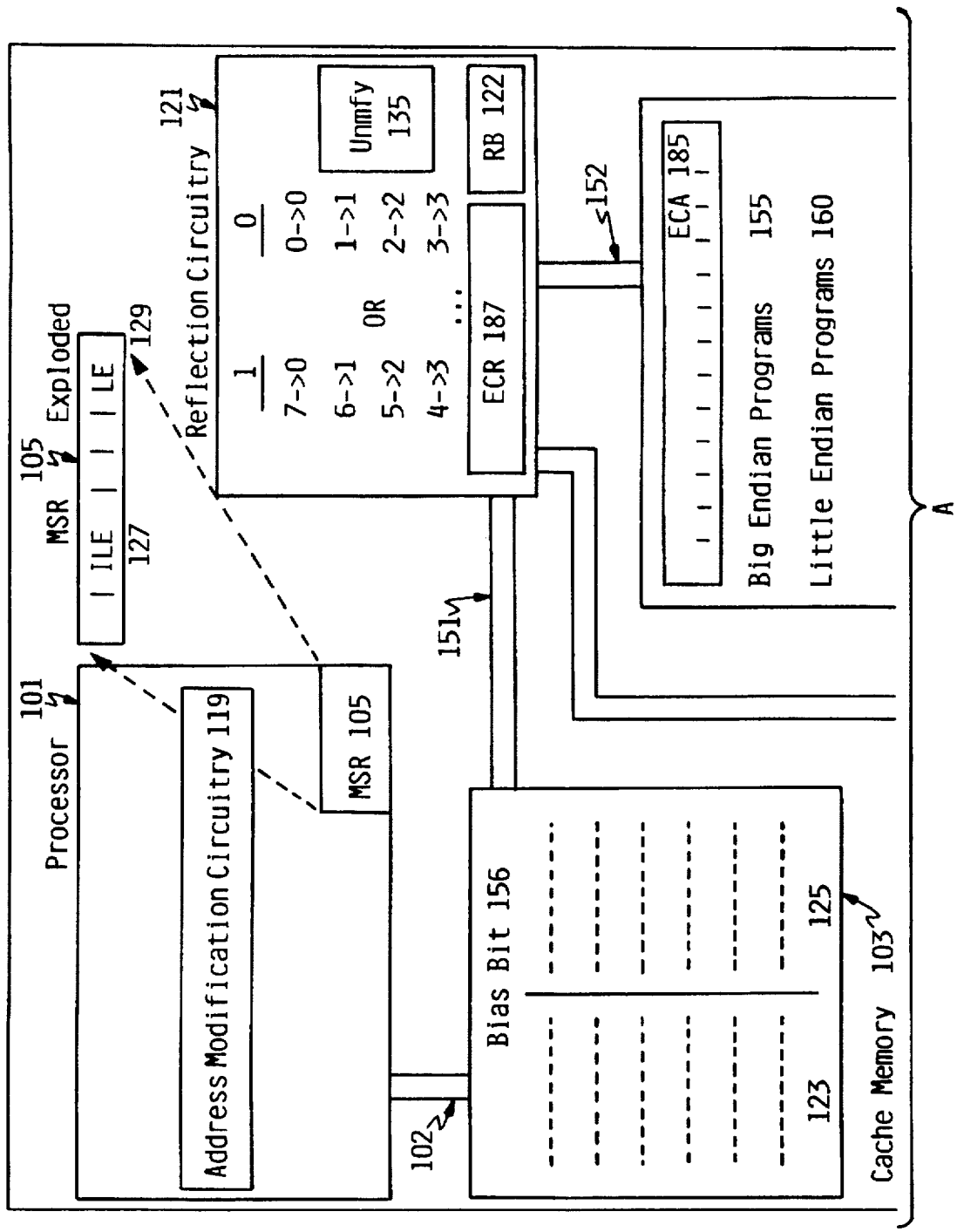
FIG. 1 is block diagram showing the computer system of the preferred embodiment.
Figure 1B:
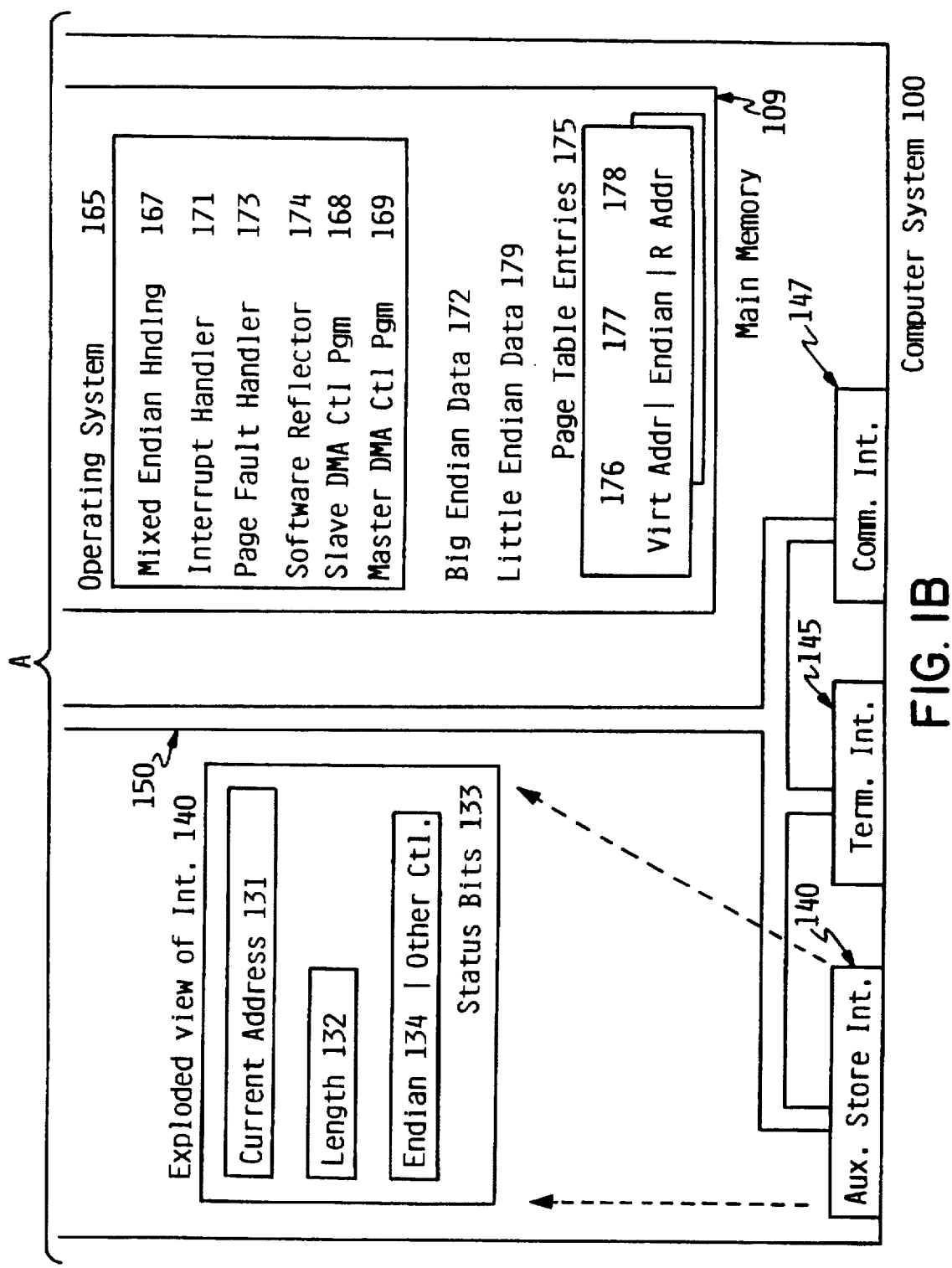

FIG. 1 shows a block diagram of the computer system of the present invention. The computer system of the preferred embodiment is an enhanced IBM AS/400 mid-range computer system. However, the present invention applies equally to any computer system, regardless of whether the computer system is a complicated multi-user computing apparatus or a single user device such as a personal computer or workstation. As shown in the exploded view of FIG. 1, computer system 100 comprises processor 101 connected to processor bus 151 via cache memory 103 and local processor bus 102. Processor bus 151 is connected to I/O bus 150 and to local memory bus 152 via reflective circuitry 121.

In the preferred embodiment, auxiliary storage interface 140, terminal interface 145, and communications interface 147 are also shown to be connected to I/O bus 150; however, I/O bus 150 could also be an external bus. Auxiliary Storage Interface 140 is also shown in exploded form to reveal further details. Main memory 109 is connected to reflection circuitry 121 by local memory bus 152.

Processor 101 comprises address modification circuitry 119, and machine state register (MSR) 105, which is also shown in exploded form to reveal further details. Processor 101 is an enhanced IBM bi-endian Power PC processor; however, any two step, mixed endian or bi-endian processor could be used. Address modification circuitry 119 is responsible for performing the address modification of FIG. 3b; however, its function could also have been implemented in software. MSR 105, which contains current task information associated with processor 101, also contains little endian (LE) status bit 129 and interrupt little endian (ILE) status bit 127. LE bit 129 indicates whether an address modification should be performed during a memory reference. The value of LE bit 129 is set by operating system 165 to reflect the endian of the current task running on processor 101. In the mixed endian environment, in which the present invention operates, the value of LE bit 129 varies in real time as software tasks of different endian execute on processor 101.

ILE bit 127 indicates the state that LE bit 129 is to become upon receiving a processor interrupt. Details of the setting of ILE and LE are in the Mixed Endian Computer System.

Cache memory 103 comprises cache arrays 123 and 125. Cache memory 103 is a two way associative, copy-back cache; however, the present invention is not limited to any particular cache mechanism. Cache arrays 123 and 125 each contain a plurality of cache array elements. Each cache array element contains a cache line, which contains the actual data, and certain control information. It is possible for some references to bypass the cache and go directly between bus 102 and 151 (e.g. for certain I/O Register references; see *The PowerPC Architecture* section 4.6 of Book II for an example).

Reflection circuitry 121 comprises reflection circuitry that is controlled by external reflection bit (RB) 122 of the present invention, whose source is dependent upon the operation in question:

1) For memory references to and from the cache, RB 122 comes from bias bit 156.
2) For master DMA references, RB 122 comes from the endian bit 134 of the associated master DMA interface.
3) For slave DMA references, the Endian Control Register (ECR) 187 is used to index into a main storage array, the ECA 185 and fetch the low order bit of the associated byte to set RB 122.

Once RB 122 is selected or transmitted to reflection circuitry 121, a value of "1" means that each aligned doubleword or portion thereof is reflected according to the rules of FIG. 3a. If RB 122 is "0", an ordinary byte-by-byte copy is performed. This is shown graphically, in part, in reflection circuitry 121 in FIG. 1. Endian Control Register (ECR 187) is also provided to enable the Endian Control Array 185 to be accessed. Note that in the preferred embodiment, the duration of RB 122 endures only for the duration that the hardware involved owns the bus pairs 151 and 152 or 150 and 152 and must be set for each reacquisition of the resources. As provided in *The PowerPC Architecture*, a big endian internally biased processor will use address modification circuitry 119 to modify the address provided by the programmer to the address presented to main memory 109. In the case of I/O register references, it will be necessary to reverse this modification. Unmodifier 135 presents the true (unmodified) address to bus 150, regardless of the value of LE 129 along with associated function as described below.

Main memory 109, which is also known as paged memory, contains big endian programs 155, little endian programs 160, operating system 165, and other programs (not shown). Big Endian programs 155 are programs that are designed to expect and operate with big endian data 172, while little endian programs 160 are programs designed to expect and operate with little endian data 179. In special cases, however, programs operating in the Mixed Endian Computer System can be designed to expect and operate with data of the alternative endian. In addition, the present invention provides an additional storage array, one byte per real page frame (not shown), called the ECA (Endian Control Array) 185 which is used to control the endian state on slave DMA references.

Operating system 165 executes on processor 101 and is based on an enhanced IBM MicroKernel based, multi-tasking operating system; however, any appropriate multi-tasking operating system could be used as a base. Operating system 165 has been enhanced by the addition of mixed-endian handling mechanisms 167, which comprise interrupt handler 171, page fault handler 173, and reflector 174. Mixed-endian handling mechanisms 167 are responsible for dynamically controlling and tracking the two step process of processor 101. Further, operating system 165 has been enhanced by the addition of Slave DMA Control Program 168 and Master DMA Control Program 169, which execute on processor 101 to carry out the present invention as more fully described in the logic flow diagrams of FIGS. 6 and 7.

Main memory 109 also contains big endian data 172, little endian data 179, and page table entries 175. Each of page table entries 175 comprises, among other things, virtual address 176 endian bit 177, and real address 178. There is one page table entry for each memory page currently in memory 109. The endian bits 177 contained in page table entries 175 denote the endian of the page: "1" for little endian and "0" for big endian in the preferred embodiment.

Auxiliary storage interface 140 is used to interface computer system 100 with auxiliary storage devices such as magnetic or optical storage devices. It comprises the set of master DMA control registers: Current Address 131, Length 132, and Status Bits 133. Status Bits 133 includes Endian bit 134, the function of which is described below under Master DMA. While Status Bits 133 has "status" in its name, subsequent discussion will demonstrate that some bits also have control functions; the single name was chosen to simplify exposition and the figures.

Likewise, similar constructs to current address 131, length 132, and status bits 133 in Terminal interface 145 and Communications interface 147 are not shown. Any variations between auxiliary storage interface 140, terminal interface 145, and communications interface 147 relate to differences in the I/O bus externally defined relative to processor 100. Such buses operate as if they provided data transfers on an aligned doubleword boundary or fully-contained subset thereof. Terminal interface 145 allows system administrators and computer programmers to communicate with computer system 100, normally through programmable workstations.

Communications interface 147 is used to interface computer system 100 with external communications networks such as local area networks (LANs) and wide area networks (WANs). Although the system depicted in FIG. 1 contains only a single main CPU and a single system bus, it should be understood that the present invention applies equally to computer systems having multiple main CPUs and multiple I/O buses. Similarly, although the bus of the preferred embodiment is a typical hardwired, multidrop bus, any connection means that supports bi-directional communication could be used.

Enhanced DMA Operation of the Present Invention
Slave DMA

"Slave DMA" is an operation in which the mixed endian processor 101 passively receives the data from another source such as through auxiliary storage interface 140, terminal interface 145, and communications interface 147; such sources may or may not be mixed endian.

In the preferred embodiment, data flowing across any external I/O medium, such as the means connected to auxiliary storage interface 140, terminal interface 145 or communications interface 147, is in true endian format and is not in the intermediate, reflected format shown as the second and third data layouts in FIGS. 4a, 4b, 4c, and 4d. Such a format is not known in the industry today and its escape into the computing world is undesirable, and moreover, except as described in the Mixed Endian Computer System, the programmer's eye view of this storage is such that most programs cannot tell the data is reflected. Thus, it is required that the reflected data forms of the two-step reflection process of the PowerPC or similar processor is not externalized outside of main storage. Accordingly, the present invention shows how the required doubleword reflections are accomplished in hardware by transforming the data, when slave DMA Control Program 168 wishes, from a true little endian format to a doubleword reflected format or, since the operation is symmetric, vice-versa.

While in the preferred embodiment, little endian data is reflected, the reflection could be applied instead to big endian data. For example, suppose the bias bit 156 in cache 103 was be configured to be a "1" such that all references destined to flow over local memory bus 152 were affected. In that case, a fixed doubleword reflection would be performed on data flowing to and from main memory 109 via local memory bus 152 to cache memory 103. If so configured, main store would have its data DMAed in true little endian format with big endian data being doubleword reflected. Thus, only the little endian data is shown as reflected herein, but big endian data could also be reflected.

Figure 6A:
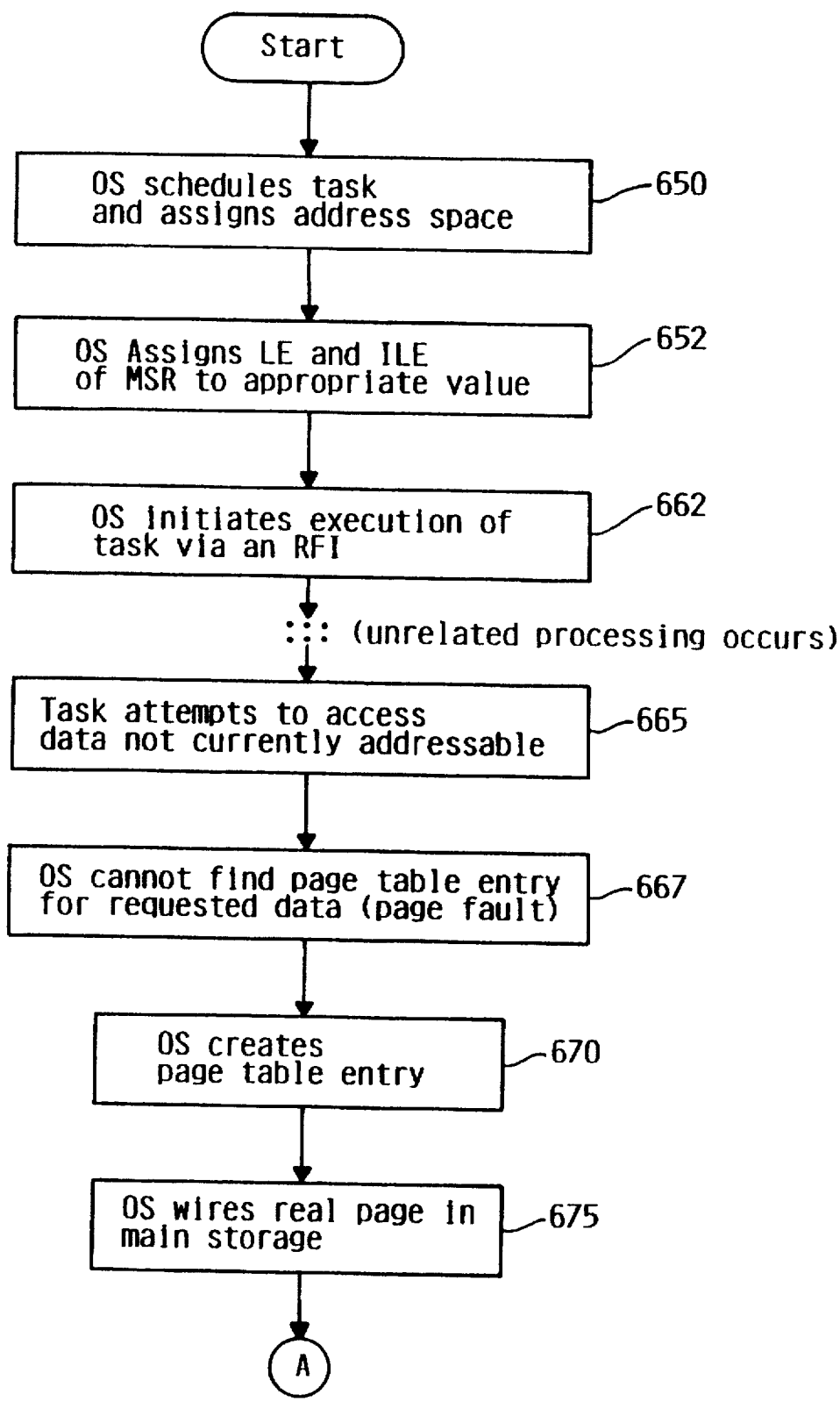
FIG. 6 is a logic flow diagram illustrating an example of how slave DMA in the preferred embodiment operates.

FIG. 6 illustrates the logic flow of a slave DMA operation. Operating system 165 creates tasks in big or little endian format and assigns the appropriate values of ILE 127 and LE 129 such that when the task is operating, its MSR 105 is loaded with the proper values when the task is initiated or switched back into operation as shown in blocks 650, 652, and 662. After a given task runs, it may directly or indirectly wish to perform I/O. In the example of FIG. 6, this is done indirectly by having the task being described suffer a page fault; that is, it tries to access a virtual storage page not currently in main storage as shown in block 665. Operating system 165 confirms that the page fault is caused by the absence of the real page and not some other cause, as shown in block 667. Operating System 165 assigns an available real page to be the target of a page-in DMA operation as shown in block 670. Operating System 165 further determines, using the means described in the Mixed Endian Computer System, as part of the operations in block 670, whether that newly allocated page is to be treated as big endian data or little endian data due to the state of its corresponding virtual page.

Accordingly, when it comes time to prepare for the DMA, operating system 165 knows the desired reflection state of the data to be transferred. Typical DMA operations involve the "pinning" or "wiring" of main storage as shown in block 675. I/O is typically done in the "real" or "untranslated" address range; a set of linearly increasing storage related closely to the physical layout of main storage, typically broken into power of two page frames as is well known in the art.

This invention associates ECA (Endian Control Array) 185, one bit within a byte with each real page frame. In particular, ECR (Endian Control Register) 187 contains the base address of a linear array of bytes, one byte per real page, the low order bit indicating the whether the reflection circuitry should be engaged on slave DMA requests coming to that page. After the page is wired, the endian bit associated with the page is queried as shown in block 685 by Slave DMA Control Program 168.

To obtain the ECA byte and its associated bit, block 685 proceeds as follows. The real address may be taken as a real page frame address and an offset. To determine what byte to set the endian bit in ECA 185 to, it is only necessary to shift the real page frame address N bits to the right (that is, shift it right sufficiently well to eliminate the page offset) and then add this value to a copy of the base address from ECR 185, placing the result in a suitable internal general purpose register (not shown) to fetch, modify, and store the byte so addressed. Note that for ECA 185, this access must be done without reflection; that is, in the preferred embodiment, under big endian rules. A little endian program would therefore require the added step of exclusive ORing the calculated address with the value 7.

Since the page is wired or pinned, the real address of the page cannot be altered nor can the page's associated virtual address be destroyed or the real page unassigned prior to completion of the DMA (as is typical in the art). Thus, depending on the value of Endian bit 177 in the page table of the underlying virtual page in question, ECA byte 185 may be set appropriately by Slave DMA Control Program 168 to big endian at block 680 or little endian at block 687 without concern that operating system 165 will desire to change the status of the real page frame involved. Once the ECA bit is set by Slave DMA Control Program 168, control is returned to operating system 165, which uses means common in the art to initiate I/O from whatever source contains the Master DMA logic and to await the completion of the Master/Slave DMA transaction.

Figure 8A:
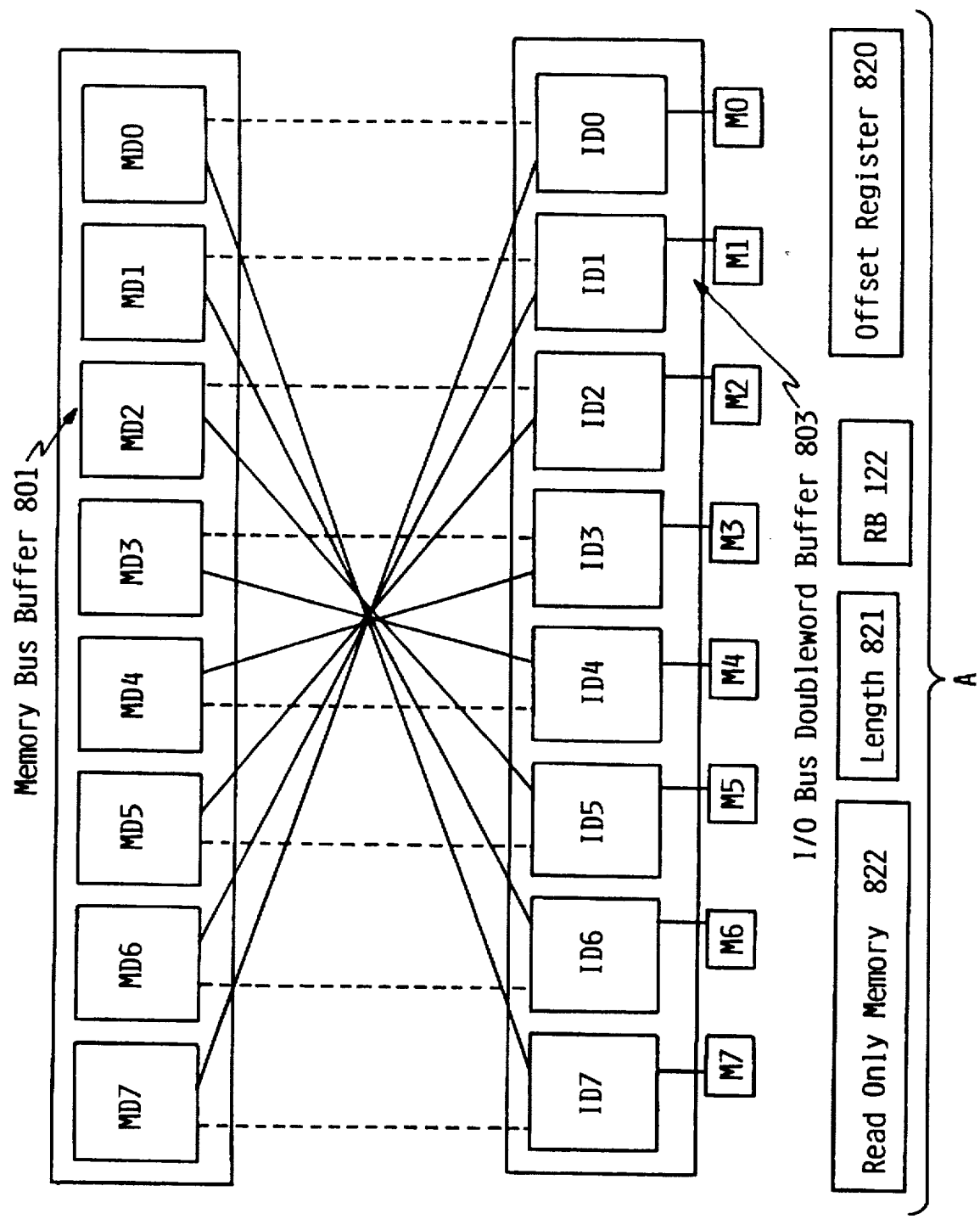
FIG. 8 shows details of the DMA operation in the preferred embodiment, including programmable doubleword reflection as part of the data transfer.

When the hardware Slave DMA commences, in the preferred embodiment, having the ECA byte set as little endian causes reflection circuitry 121 to be engaged to perform a data reflection as shown in block 689, as further described under the description for FIG. 8. Likewise, if ECA byte 185 is set to big endian, the slave DMA will do a byte-by-byte copy via reflection circuitry 121, as shown in block 681 and further described in FIG. 8.

Once the I/O DMA commences, in either blocks 681 or 689, any storage reference to main storage 109 due to the slave DMA transfer consults ECA 185. In a typical DMA hardware implementation, the hardware has arbitrary access to real storage addresses, or at least to any address required for successful transfer; this is assumed here. Thus, when the slave circuitry supporting some master DMA's operations gains control of the busses 150 and 152, it does preliminary access of ECA 185 before beginning transfer operations on a new page. It does so by shifting the real page address presented by the master such that the offset within the page is eliminated as Slave DMA Control Program 168 had previously done, and adds this amount to a local copy of the ECR (not shown) associated with the DMA pathway. This updated copy of the ECR's value is used as a real address to fetch ECA byte 185 (the circuitry in 121 on the ECA reference is instructed to use big endian rules) and the associated endian bit is copied to reflection bit RB 122. RB 122 is then used to control reflection circuitry 121 for the DMA transfer, using the fetched ECA endian bit to control whether the bytes are copied in the typical byte-by-byte order as shown at block 681 or whether the bytes being transferred are doubleword reflected (including partial doubleword transfers) to set the resulting transfer into storage in doubleword reflected form as shown at block 689. This is all performed by slave-side circuitry independent of the master, which merely asserts its slave DMA address and waits for permission to transfer the data in its true endian form on I/O bus 150 using means common in the art. The slave access and copying of ECA bit 185 into reflection circuitry 121 is accordingly transparent to the master. RB bit 122 is associated with a transfer. Therefore, if the DMA cannot be accomplished in a single transfer, RB bit 122 must be reestablished in accordance with the above description for every re-acquisition of the bus resources 150 and 152 and any required acquisition of bus 151 for cache coherency operations. In the latter case, bias bit 156, not ECA bit 185, is used to control the reflection circuitry.

In the preferred embodiment, processor 101 has a big endian internal bias and bias bit 156 is zero (that is, there no doubleword reflection in the interface from main store to the cache). Due to symmetry, either an internal processor bias of little endian or the setting of bias bit 156 will reverse the value of the bit stored in the ECA from 0 to 1 or 1 to 0. Likewise, setting both bias bit 156 and having an internal processor bias of little endian will cause, due to symmetry, the endian bit to be set in the manner shown herein. Thus, it is sufficient to describe the endian bit of the ECA as a one in the little endian case. Note explicitly that what is actually being managed here is when to reflect data and that it is associated with one endian or another, but that endian may vary by the embodiment. In this preferred embodiment, having it at value 1 (that is, true; that is, engage reflection) is associated with little endian.

Note also that ECR 187 could reside in storage or any other suitable means that provide the needed control. Likewise, ECA 185 could be in a register or any other suitable means that provide the equivalent function. In particular, ECA 185 might be a bit array (in register or main storage form) or a bit which is part of a larger table entry containing other real page related information. Also, locating the proper endian bit in ECA 185 could be done through a variety of means more elaborate than the simple linear mechanism shown here.

After the transfer completes, operating system 165 does any associated cleanup, making the page addressable and unwired and returns control to the interrupted task as shown in block 682 for access in block 693. The interrupted task will attempt to reexecute the instruction causing the page fault, which will now succeed, causing the data to be copied from the main memory page into cache and any associated processor items such as general programming registers.

In this example, the entire I/O DMA is treated as if it accessed only a single page. However, the I/O DMA could span multiple virtual address pages and the requests could be broken up into a plurality of real pages. Each real page in the request would then need to be wired and have its ECA bit set.

Further discussion of the operation of blocks 681 and 689 occur in the discussion of FIG. 8, below.

Master DMA

Figure 7A:
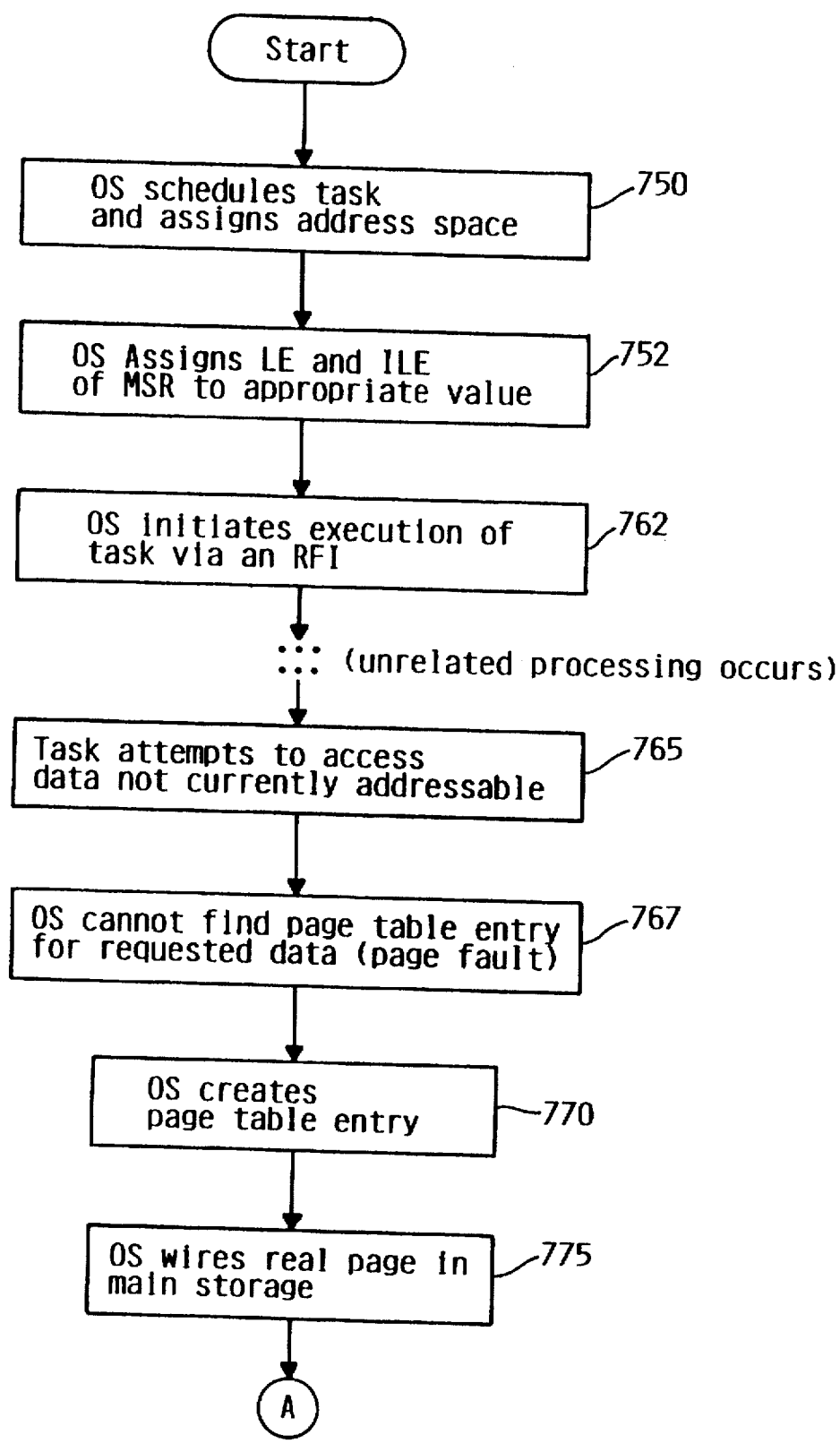
FIG. 7 is a logic flow diagram illustrating an example of the how master DMA in the preferred embodiment operates.

Master DMA, shown in FIG. 7, is the directing of DMA into either main memory 109 from I/O bus 150 or onto I/O bus 150 from main memory 109. In the preferred embodiment, as in the slave case, the means connected to auxiliary storage interface 140, terminal interface 145, and communications interface 147 must DMA data in its "true form" and not any intermediate form arising from a two-step endian simulation. In master DMA, the system is controlling data it sources. As in slave DMA, operating system 165 knows the endian of the underlying data to be transferred. As in slave DMA, the pages involved are "wired" and therefore immobile and unable to change the virtual address state or the underlying endian of the data. Therefore, the processing for master DMA in blocks 750 through 775 is as described under the description for slave DMA blocks 650 through 675.

The only difference between blocks 750–775 and blocks 650–675 is that the master DMA logic must also obtain the slave DMA address at some suitable point and place this in a Current Slave Address location (not shown). Since the interpretation of the slave's address is controlled by the slave, what happens on the slave side is not under the control of the Master directly (see slave DMA discussion, above). Therefore, those skilled in the art can readily understand how the slave's address and the master's address are appropriately managed (e.g. if their relative offsets in the page differ) as is common in the art relative to the management of the slave address calculations and register settings. Note further that, because the data flow immediately external to auxiliary storage interface 140, terminal interface 145, and communications interface 147 are in true endian format at all times, then processor 101 and the means connected to auxiliary storage interface 140, terminal interface 145, and communications interface 147 may each implement different variants of this invention on the master and slave side, each controlling the data flow between them independently. In particular, one may be the preferred embodiment described herein where the little endian data is reflected and the other be an alternative embodiment where the big endian data is reflected, each side in mutual ignorance of the other and each managing only its own reflection. Likewise, the slave processor's storage may have no need of reflection at all.

Accordingly, when the Master DMA control program 169 checks endian bit 177 at block 785, it will set the DMA register endian bit 134 to Big Endian at block 780 or Little Endian at block 787 based on whether endian bit 177 is big or little, respectively. In addition to setting endian bit 134, three related events happen. The initial Current Address 131 for the DMA transfer is set. This is the real address from main storage 109. Length 132 is set, and the various control bits (e.g. DMA requested) 133 are set. As long as all control bits in register 133 are set together and after current address 131 and length 132, or as long as the bit(s) soliciting the start of DMA processing are set last, the exact format is not important and can be any suitable master DMA control register strategy, excepting that endian bit 134, must be one of the control bits in register 133. After the master DMA registers are set as just described, the master DMA control program 169 returns to operating system 165, which initiates I/O to whatever source contains the slave DMA logic, and to await the completion of the master/slave DMA transaction.

When the master DMA hardware gains control of the bus in block 781 or block 789, endian bit 134 of control bits 133 is copied to RB 122, which controls reflection circuitry 121 to determine if a byte-by-byte copy is performed in block 781 or if a doubleword reflection is performed in block 789 on all the bytes of the transfer.

Note that if the master is unable to complete the entire transfer from block 781 or 789 in a single acquisition of the bus resources 150 and 152, it must again set RB 122 on each acquisition of the bus resources. Note also that any cache coherency management using bus 151 will use bias bit 156 to control RB for any required data transfers.

After the transfer completes, operating system 165 does any associated cleanup, making the page addressable and unwired and returns control to the interrupted task at block 782 for access at block 793. The interrupted task will attempt to reexecute the instruction causing the page fault, which will now succeed, causing the data to be copied from the main memory page into cache and any associated processor items such as general programming registers.

In the preferred embodiment, registers are used; however, the control information in current address 131, length 132, and status bits 133 may reside in storage or any other facilities known to the art capable of providing the control functions needed.

In this example, the entire I/O DMA operation is treated as if it accessed only a single page. However, the I/O DMA could span multiple virtual address pages and the requests could be broken up into a plurality of real pages. Typically, a suitable interrupt will take place at each new real page transition and the master DMA registers must be reprogrammed for the new page in some brief temporal window from information created before the first transfer began. Endian bit 134 must have its value accounted for as part of whatever control structures are present to reprogram the master DMA registers.

Further discussion of the operation of blocks 781 and 789 follow next in the discussion of FIG. 8 and the discussion also applies to blocks 681 and 689 of the slave DMA discussion.

Details of Reflection Circuitry 121

In the preceding discussions of FIG. 6 and 7, blocks 681, 689, 781, and 789 described a reference to either a byte by byte copy or double word reflected copy taking place as part of the hardware DMA. This section will describe FIG. 8 and show how it accomplishes the byte by byte copy or reflection in the context of a preferred embodiment described DMA with an aligned double word memory bus.

In the preferred embodiment, the processor presents the appearance, at its interface to local processor bus 102, that it fetches and stores aligned doublewords, providing additional control signals (see FIG. 10 for an example of such signals) to enable cooperating external means, such as cache memory 103, to provide subsets of this doubleword for simpler fetches of lesser size. Thus, there must be a certain amount of "byte steering" that takes placed based on the width of the data actually fetched and its relative location in the doubleword. This byte steering is a consequence that, for example, when fetching an aligned word and passing it through a double word interface the bytes must be steered to relative offset bytes 0 through 3 or 4 through 7, and similarly for other fetches and stores less than 8 bytes in length. Likewise, DMA hardware transfer logic faces the same issues.

In this example, local processor bus 102, processor bus 151, memory bus 152, and I/O bus 150 are all double word memory buses and perform associated steering operations as described above. However, buses of varying width could be used.

Therefore, DMA transfers must, at the relevant interface levels, masquerade as processors fetching strings of bytes within a doubleword, or equivalently, a processor could be just another source of DMA operations. Accordingly, I/O Doubleword Buffer 803 may represent either I/O bus 150 or processor bus 151. Memory bus buffer 801 will connect to memory bus 152.

Note that MD0 represents the low order eight bits (bits 0 through 7) of the doubleword memory bus buffer 801 and offset 7 into main memory 109. MD1 represents bits 8 through 15, MD2 bits 16 through 23, MD3 bits 24 through 31, MD4 bits 32 through 39, MD5 bits 40 through 47, MD6 bits 48 through 55, MD7 bits 56 through 63. Not also that MD1 is offset 6, MD2 is offset 5, MD3 is offset 4, MD2 is offset 3, MD1 is offset 6 in main memory 109. ID0 through ID7 have the same bit and offset relationships.

A memory read operation would be associated with a DMA write or a processor fetch. The incoming address (not shown) from I/O bus 150 or processor bus 151 is divided up such that its low order three bits are separately sent to offset register 820. A copy of this address, with the low order three bits set to zero, is sent to the main memory 109 in order to fetch the associated doubleword into memory bus buffer 801 and its associated bytes 811. Note that MD7 corresponds to memory offset 0 and MD0 corresponds to memory offset 7 within the doubleword.

Since in the preferred embodiment the operation is bounded within the doubleword, a length is associated with the request as well such that the sum of the offset register and the length are no more than one greater than the memory offset corresponding to MD0. That is, the length varies from 1 to 8, limited in magnitude by the offset value.

Based on the table in FIGS. 9a and 9b, suitable means (such as read only memory 822) are accessed, indexed by the length, the offset register, and RB 122, resulting in a bit array (any row from FIGS. 9a & 9b as selected by the aforementioned suitable means), which sets the array of Mask Transmission Control Bits 807 on the I/O Bus Doubleword Buffer side.

RB 122 likewise controls the connection between the Memory Bus buffer 801 and I/O Bus Doubleword Buffer 803. If RB 122 is a one, the bytes take the solid line pathways and are reversed according to FIG. 3a. If RB 122 is a zero, the bytes are not reversed and take the dotted line pathways directly to their counterpart byte in the I/O Bus Doubleword Buffer 803.

The mask bits additionally control which bytes are actually transmitted externally over processor bus 151 or I/O bus 150; those whose mask array bit is not a one are ignored.

Similarly, for a processor store or a DMA read operation, operation begins in a similar fashion. The storage array is accessed as before, setting the Memory Bus Buffer 801. The mask transmission control bits 807 are likewise set using the means of FIG. 9a and 9b as before. However, in this case, the transmission direction is reversed and only those bytes of the I/O Bus Doubleword Buffer 803 whose corresponding mask bit is a one, are transmitted to the Memory Bus Buffer 801. Thus, only those bytes transmitted from processor bus 151 or I/O bus 150 are modified in memory bus data buffer bytes 811. Note again, however, that which memory bus buffer byte receives a value when the mask bit is a one is controlled by RB 122. If RB 122 is a one, then the corresponding "reflected" byte as shown by the solid lines (byte reversal pathways 805) is altered according to FIG. 3a when the corresponding mask array bit is a one, or not copied otherwise. If RB 122 is a zero, then the bytes are copied directly, byte for byte (using dotted line byte-by-byte pathways 806) when the corresponding mask bit is a one, or not copied otherwise.

Therefore, when the cycle is completed, the partially or fully modified doubleword is written back to main memory 109.

I/O Register Operations

Figure 10A:
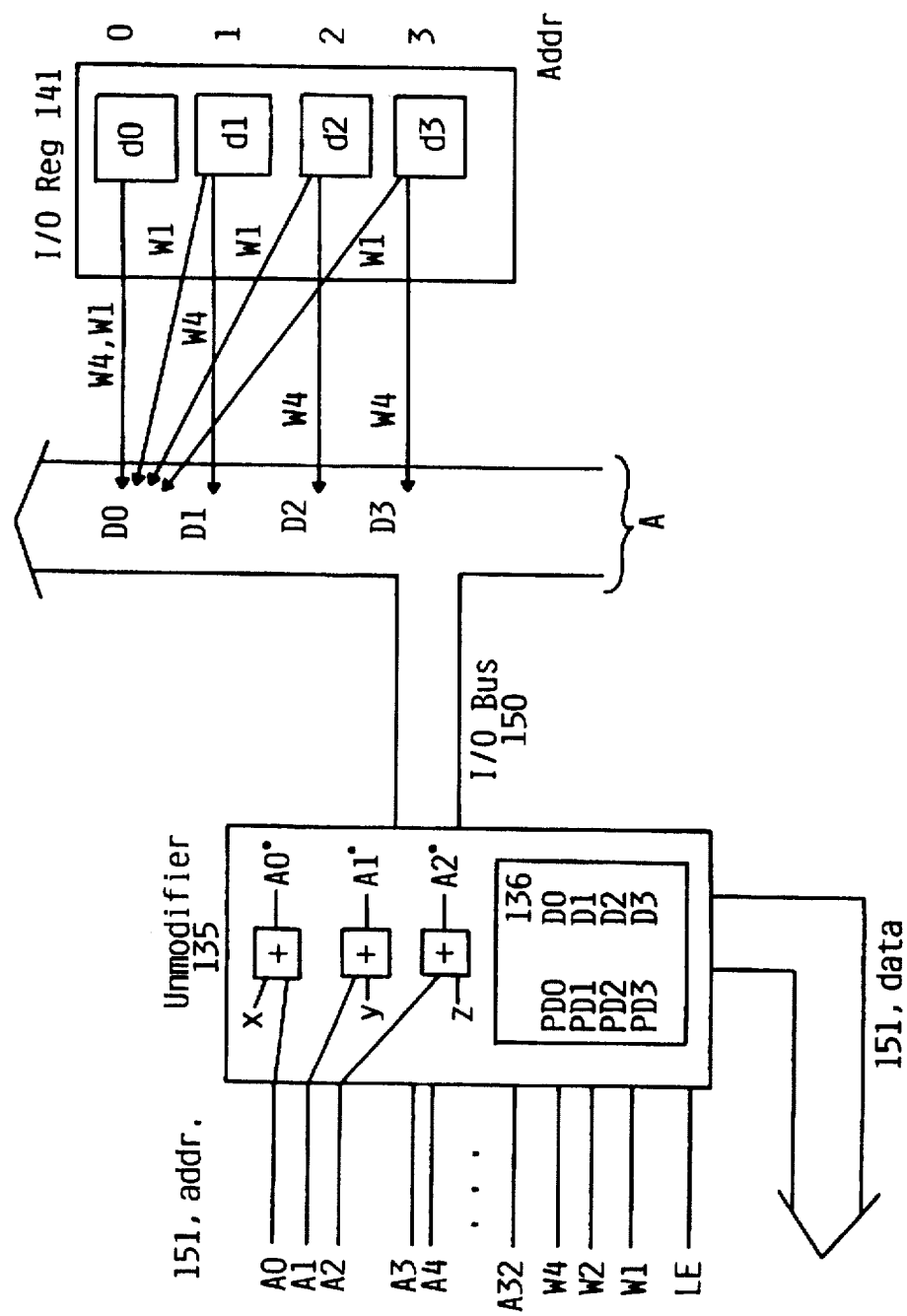
FIG. 10 shows the I/O registers and data flow of the preferred embodiment.

In FIGS. 10, 11, and 12, a separate enhancement is described. Processor I/O Bus 151 from FIG. 1 is broken into two pieces: a data bus (wherein the data flows to and from the chips as data bits data0 (the low order bit), data1, data2, . . . , data63 (the high order bit) for a 64 bit bus in the usual manner). For convenience of exposition, data0 through data7 are called PD0, data8 through data15 are PD1, data16 through data23 are PD2, data24 through data31 is PD3, data 32 through 39 is PD4, data40 through data47 is PD5, data48 through data55 is PD6 and data56 through data63 is PD8. On bus 150, the bytes with the same relationship to a 64 bit integer are called D0, D1, D2, D3, D4, D5, D6, D7, and D8, respectively. The I/O registers, being in this example only four bytes wide, implement bytes d0, d1, d2, and d3 corresponding to data bits 0 through 31 in the same way as the 64 bit case. Address lines A0 (the low order bit) through A31 (the high order bit) are likewise shown, along with W1, W2, and W4, which represent fetch operations of one byte, two bytes, and four bytes respectively. The LE 129 bit is sent, as are the address, data, and W bits, from the processor 101 on bus 151. Bus 150 is the modified version of bus 151, except that address bits A0, A1, and A2 may have been changed by Unmodifier 135 and its D0, D1, D2, and D3 come by way of the byte multiplexing circuit 136, present inside of Unmodifier 135.

In the preferred embodiment, as in *The PowerPC Architecture*, I/O registers are not cached. Accordingly, processor bus 151 will be considered to be connected directly to local processor bus 102 and thus, for this I/O register section of the exposition, 102 and 151 can be considered as if they were a single bus.

Circuit 136 is there to account for the fact that the processor 101 has an internal data flow of big endian, even when running in little endian mode as per Appendix D of Book I of *The PowerPC Architecture*. Additionally, the circuitry of 136 must account for the fact (in this embodiment) that the processor 101 presents an aligned doubleword interface to its bus 151 (see Detailed Description above). Thus, when either an 8 bit, 16 bit, 32 bit or 64 bit entity is fetched, the bytes must be steered to their appropriate location on PD7 . . . PD0 to permit the processor to access the transmitted bytes as if they had come from regular storage in accordance with the requirements of PowerPC architecture and this embodiment.

Now, since the processor is still performing the address modification, Unmodifier 135 presents the "true" (unmodified) address to bus 150, regardless of the LE bit value. When the data is placed on bus 150, the data is therefore placed on the bus in a bit-accurate form based on the width of the register. Accordingly, it only remains to "steer" the bits to the correct location within the double word on bus 151. This must be done differently based on which endian mode (that is, whether LE=1 or LE=0) so that it preserves the appearance, on the processor side of Unmodifier 135, that doubleword reflection is still happening when LE=1. Thus, the tables in FIG. 11 and 12 show different byte steering for data fetch. Those skilled in the art will readily appreciate that similar figures could be constructed for the store case and how 136 would operate in the case of a data store, which is not further described. Note that in the FIGS. 11 and 12, the storage width and LE value selects which byte steering is to be done. Likewise, note that "Addr." is included for reference. It is not strictly part of the registers, but is an aid to forming a correspondence to what would be storage offsets, thus making it easier to understand the connections between the various data busses. PD7 through PD0 have the same byte offset and bit relationships as for the earlier MD7 through MD0 and ID7 through ID0.

There are three I/O registers shown, I/O Register 141, I/O Register 142, and I/O Register 143. FIG. 10 is based on a 32 bit address and 64 bit data bus, but can be readily extended to other sizes of either address width or data width. Processor bus 151 could also be 64 bits of data and I/O bus 150 could also be 32 bits of data. Likewise, while the example is stated in terms of a load operation, the store operation is easily inferred from the description given by those skilled in the art.

Without loss of generality, any programmable I/O resource may be viewed as if it were a register. It can be "memory mapped", but this distinction relates to a particular process architecture and whether there is a formal I/O instruction (e.g. as in Intel) or whether it appears to be some special subset of the random access memory range (which often is assigned a revealing name like "the I/O space"), it remains true that I/O resources are accessed under special rules. I/O resources can seldom be accessed at arbitrary offsets in arbitrary ways as ordinary main storage may be accessed. That is, significant restrictions on I/O "register" access are common, regardless of whether it is implemented as a physical register or as I/O memory in an array of read/write, random access memory, because it is typically tied in some manner to control logic. Alignment must be strictly observed in many cases, the register must often be accessed with an instruction using a particular integer width (e.g. 16 bit fetch) due to various side-effects of accessing said register. Moreover, even if such restrictions happen not to be present, physical registers are as likely to allow arbitrary access as "memory arrays". Thus, it will be presumed that various resources controlling I/O can be viewed as "I/O Registers" accessed through some form of address identifier or "memory map" address that can be presumed to be of known alignment and width.

In conventional mixed endian systems, it would typically be necessary to assign an endian status to an I/O register for an I/O register such as 141. I/O registers tend to have a recognizable endian, one way or another because they frequently can be fetched as integers of a specific width (and, more rarely, of multiple widths). While the width may be fixed at, for example, 32 bytes, the actual contents may actually be a string of bytes, thus introducing endian considerations. The examples of 141 or 143 are typical, but more complex cases are possible. Such definitions are in the I/O register chip's documentation and tend to imply an endian that the programmer must account for. Therefore, because of the need to use industry standard parts and use them in ways consistent with their specification, references to I/O registers should not be doubleword reflected, but instead made in true form.

Accordingly, the circuitry of the Unmodifier 135 simply takes in the LE bit from the processor, the length of the integer fetched or stored, and performs the operations of FIG. 3b if the LE bit is one. Due to symmetry, this "undoes" the address modification for little endian performed by the processor of this embodiment and thus and unmodified address is presented in either endian. Within 135, the smaller boxes with the plus sign each represent the well-known exclusive Or operation. The inputs to the three exclusive Or boxes, x, y, and z, are described by the expressions given below Unmodifier 135, with the ampersand (&) representing logical AND and the vertical bar (|) representing logical Or.

Since such circuitry is well-known in the art, no further details need be given. When the address is placed on the I/O bus 150, the bits A0', A1' and A2' replace the original A0, A1, and A2, respectively.

There are two sorts of I/O registers. The traditional prior art register is given in 141 and 143. These particular I/O registers happen to be able to be viewed two ways; as a 32 bit integer and as 4 8 bit integers. Attempts to access at other sizes are undefined; the chips don't recognize how to deal with them. Such restrictions are common in the art. Each of the internal bytes, d0, d1, d2, d3 are sent to the correct data byte on the bus as shown. For 141: If fetched as a 8 bit integer (W1 is true), then the byte d0, d1, d2, or d3 is selected based on the low order two bits of the address (as A0' A1' from Unmodifier 135) which for 141 corresponds to their byte number. When fetched as a word, correct operation of the chip demands that A0' and A1' be zeros and thus the 32 bit entity is always delivered in a one-to-one correspondence. Thus, D0 is always sourced from d0, D1 from d1, etc. For 143: If fetched as a 8 bit integer (W1 is true), then the byte d3, d2, d1, or d0 is selected based on their address, which for 143 is an exclusive Or of the constant 3 with the byte number (i.e. d0 is address 3, d1 is address 2, etc.). When fetched as a word, correct operation of 143 demands that A0' and A1' both be zeroes and thus the 32 bit entity is delivered with d3 going to D3, d2 going to D2, d1 going to D1 and d0 going to D0.

The programming consequences of this model are simple; I/O register 141 is a little endian register and big endian programs will conclude that the data, as loaded into a general purpose register in Processor 101, will be in the "wrong" endian order. This can be confirmed by the expedient of storing the bytes one at a time and loading them as a 32 bit integer. Likewise, I/O register 143 is a big endian register and little endian programs will conclude that the data, as loaded into a general purpose register in processor 101, will be in the "wrong" endian order. This can be confirmed by comparing the load of 143 one byte at a time versus loading all four bytes as a 32 bit integer, accounting in both the 141 and 143 cases for the fact that d3, d2, d1, and d0 are loaded from offset 0 when processed as a 32 bit integer and that d3 (for instance) is loaded from offset 0 of 143 and d0 is loaded from offset 0 of 141 when these registers are accessed in a byte width.

So far, this is still a description of a conventional mixed endian machine (indeed, many bi-endian machines and even mono endian machines with "foreign" I/O chips work this way). This invention then adds the following property for those I/O registers able to provide the function:

Unlike the I/O register 141, this invention provides that the I/O register 142 is both aligned and fetched in a fixed width. Exploiting this property by the chip means that, unlike the more general case, the Unmodifier circuit 135 (using 136) can perform endian conversion and so the chip 142 can provide automatic conversion. Without loss of generality, only a 32 bit register is shown in 142, but this would apply to any aligned integer size.

For I/O Register 142, the bytes are loaded on the bus 150 in the order dictated by the bits. Thus, d3 goes to D3, d2 to D2, d1 to D1. Thus, bus 150 is actually endian neutral. The circuitry of 136, however, is able to treat the integer as a big endian integer (since it knows the ordering of the bits on bus 150) and, through performing the appropriate byte steering for the current value of LE 129, deliver the bits correctly in either endian mode according to FIGS. 11 and 12.

This invention makes it possible for code in a mixed endian environment to access single-width I/O registers appropriately aligned and of a single, fixed size in both endians. Note that registers which permit multiple widths to be fetched are not eligible for this treatment. Such registers must deliver data in a known endian and ignore the LE bit, simply providing the data, bit for bit, to bus 150. In this unenhanced form; access by the opposite endian means software must manually invert the integer data returned as described for I/O registers 141 and 143 when the "wrong" endian register is accessed.

Alternative Embodiment

Figure 13A:
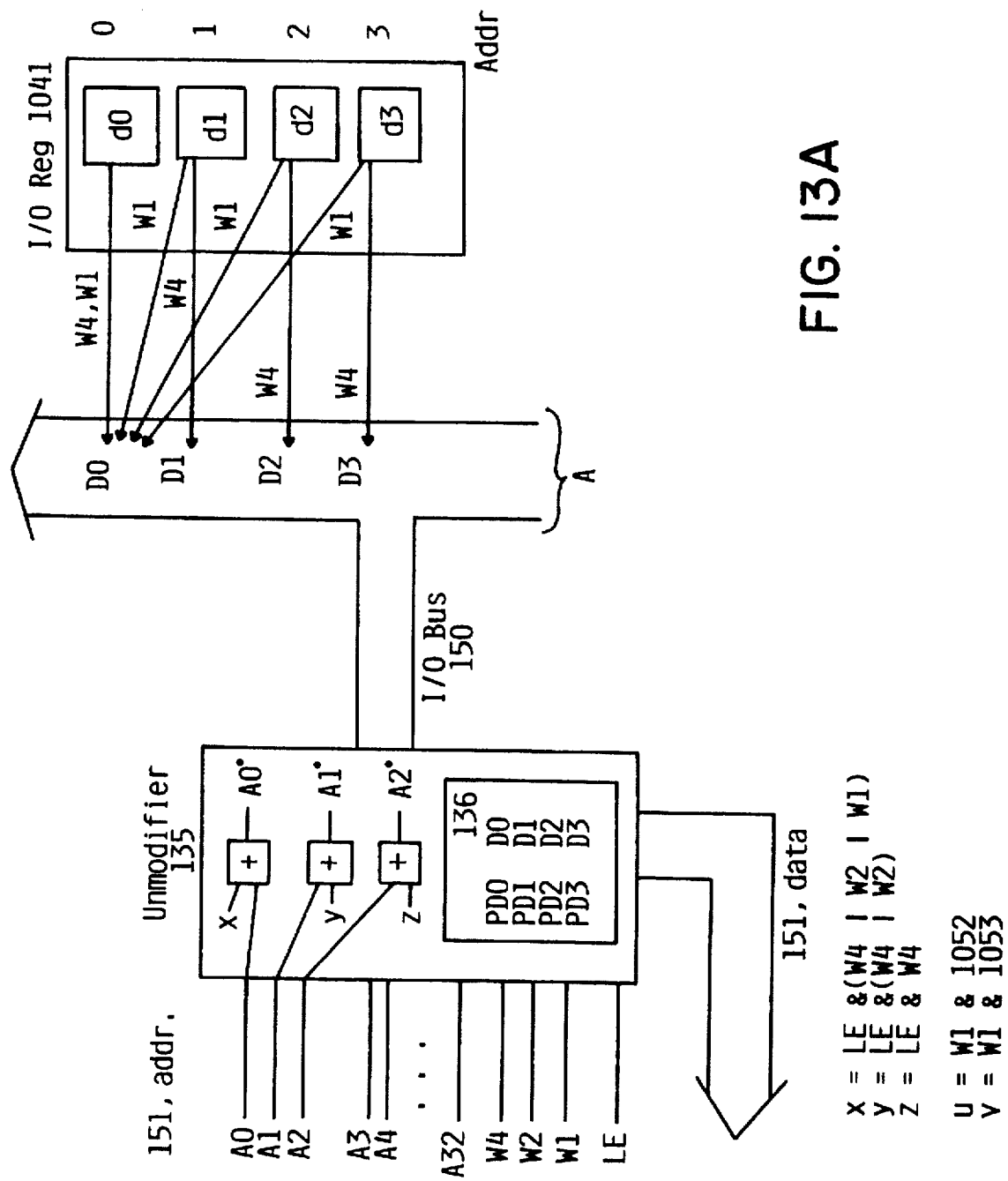
FIG. 13 shows a data diagram of an alternate embodiment to the preferred embodiment of FIG. 10.
Figure 13B:
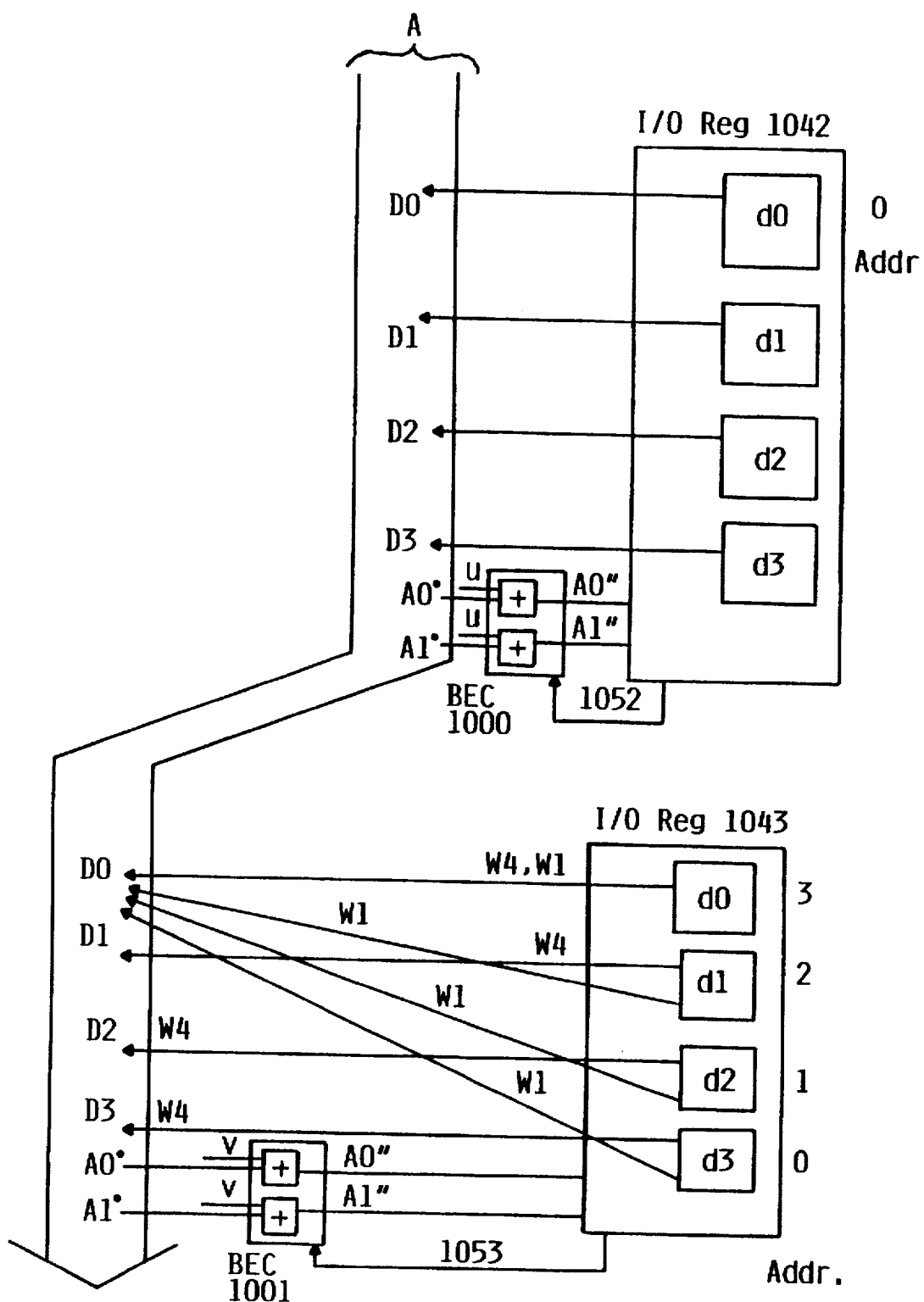

FIG. 13 is an alternative embodiment to FIG. 10. In FIG. 13, the rules for I/O Bus 150 are slightly different than for FIG. 10. The bus of FIG. 10 is endian neutral; that is, I/O Registers of either endian are permitted to hook up to the bus and they are addressed in their own fashion. In the bus of FIG. 13, there is a definition that effectively is endian sensitive. That is, there is an explicit requirement that data appear to be laid out in this alternative embodiment in little endian order on I/O Bus 150. Therefore, I/O Register 1041, being a little endian register, is identical to I/O Reg 141 of FIG. 10.

However, registers 1042 and 1043 are considered big endian registers and so require an adjustment in order for them to appear on I/O bus 150 as little endian. Due to I/O Bus 150's revised definition, this means that accessing the high order byte, if permitted separately by the given register, must be accessed by address offset 3 on the bus, not offset 0 as the base chips of 1043 and 1042 would require. There are related consequences for other big endian registers of various sizes and allowing various accesses. This would vary slightly by the example, but the circuitry of 1000 and 1001 (both called Big Endian Converter or BEC) suffice for I/O registers 1042 and 1043. Since these two registers only implement 32 bit and 8 bit formats, it is sufficient to selectively convert the address bits A0' and A1' placed on I/O bus 150 by Unmodifier 135 to new forms A0" and A1". Note that Unmodifier 135 is unchanged over the preferred embodiment already described in FIG. 10.

This selective conversion is done based on a programmable input signal. In BEC 1000, this is signal 1052 coming from I/O Register 1042. In BEC 1001, this comes from signal 1053 in I/O Register 1043.

A0' and A1' are each exclusive Or-ed with (in BEC 1000) the output of the logical AND of W1 from Unmodifier 135 and the signal 1052 producing, respectively, A0" and A1" which are fed to I/O Register 1042 as the actual address lines to use.

A0' and A1' are each exclusive Or-ed with (in BEC 1001) the output of the logical AND of W1 from Unmodifier 135 and the signal 1053 producing, respectively, A0" and A1" which are fed to I/O Register 1043 as the actual address lines to use.

Notice, therefore, that the BEC circuitry of 1000 and 1001 is identical for both of the two I/O Register types. The differences are in the input signals in terms of their source, values, and the consequences of setting them to zero or one.

It only remains to describe the function of 1052 and 1053. I/O Register 1042 is a fixed width register. It would be desirable to define it such that it operated identically between the endian modes. This is done by having signal 1052 set to 0 (false). Accordingly, the unmodified form A0' and A1' is fed to the I/O Register 1042. Since the only valid offset (in either endian) to access this register is offset 0, it is accordingly loaded properly, bit for bit, on the I/O Bus 150 and produces the correct results in either endian as was the case in I/O Register 142 of FIG. 10.

I/O Register 1043 is not a fixed width register. It must therefore appear to I/O Bus 150 to be a little endian register all the while being accessed, from its perspective, as the big endian register it was defined to be. This is done by setting signal 1053 is set to 1 (true) via I/O Register 1043. In this case, access of offset 0 as a word fetches the information in the expected order for a 32 bit integer as defined by the I/O Register (because W1 is false), but also as defined for the bus, bit by bit as required. This part is independent of the endian considerations. When single byte accesses are made however, endian considerations require the bits A0' and A1' to be inverted. Because W1 is true and 1053 is true, the exclusive ORs of the BEC 1001 (that is, the boxes with + inside) are invoked and it is made to therefore appear to the I/O Bus 150 that bytes are being stored at offset 0 when the I/O Register 1043 sees them at offset 3. I/O bus offset 1 is converted to I/O Register offset 2. I/O bus offset 3 to I/O Register offset 0. The BEC has converted the little endian form as seen on the bus to big endian format for the particular register type illustrated in 1043.

Other forms of a BEC could be defined for other kinds of I/O Registers and those skilled in the art can extend this example to account for the many variations of sizes and alignment. Note that signals 1052 and 1053 can be part of the I/O Register circuitry as shown, and be either a fixed value, or possibly programmed in some manner. Similarly, the signals 1052 and 1053 could be separate signals which are independently programmed or hardwired as needed.

This example could also be an I/O Bus with a big endian sensitivity by means similar to the alternative embodiment.

However, if programmed as shown in the discussion above, the properties of FIG. 10 are preserved for I/O Register 1042 in FIG. 13 just as they were for I/O Register 142 of FIG. 10. That is, I/O Register 1042 appears to be endian independent to the processor (returns the same values for big and little endian) while still following the rules of this alternate embodiment for I/O bus 150.

Likewise, I/O Register 1043 is modified as required; the I/O Register 1043 remains a big endian register, but is made to appear little endian to the bus as this alternate embodiment requires. This behavior is different from I/O Register 143, but that is due to the revised requirements of this alternate embodiment's bus.

General Applicability

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the following claims.

For example, the present invention is by no means limited to the Mixed Endian Computer System of U.S. patent application Ser. No. 08/393,968. The use of a reflected form of storage is a means known in the art and arises at a variety of times and places when endian is involved. Accordingly, the invention is also useful in a wide variety of other contexts, including other potential mixed endian system designs, bi-endian systems, or even monoendian systems. In short, the present invention can have applicability wherever it is desired to have main storage in a format that is byte reflected.

Further, it is important to note here that while the examples set forth above involved the use of data stored on auxiliary storage devices (e.g., rotating disks), the present invention is not limited in applicability to this type of storage device. Indeed, those skilled in the art will appreciate that the present invention applies equally to any means of storing or communicating both big and little endian data on or to a single computer system.

Further, the embodiments of the mixed endian computer system disclosed herein would perform equally as well in an environment where data was passed between bus connected computer systems or processors because in the end the passed data would still be loaded into cache memory 103 and main memory 109 by big endian programs 155 and/or little endian programs 160. Similarly, data that was received from an external computer network via communications interface 147 would similarly need to be loaded into cache memory 103 and main memory 109 by big endian programs 155 and/or little endian programs 160.

Further, while the examples of integer data set forth in this specification utilize only aligned data, those skilled in the art will appreciate that the concepts and techniques that are described herein are readily extendible to unaligned data (e.g., a 16 bit integer beginning on an odd address boundary) and that unaligned data cases are well within the spirit and scope of the present invention.

Further, while the focus in the above examples was on mixed endian computer systems, other environments that need a dynamic reformat of the I/O on a DMA by DMA basis will be able to make use of the methods disclosed herein. In particular, this invention would equally apply to an environment whereby a multiprocessor system involving two PowerPC processors and a common main storage, each running in a dedicated, but different endian, would share main storage and I/O facilities.

Further, while in the preferred embodiment, reflection circuitry 121 was a single, system-wide entity, replication of this circuitry (e.g. one for each master DMA path, one for each slave path) could also take place. In another embodiment, it might be associated with the number of raw, main storage pathways independent of how many forms of DMA channels are present and access to said circuitry could be sorted out by identical means used to control a traditional pathway to main storage. Thus, any of the common means of DMA access to main storage readily adapt to the above description and reflection circuitry can be controlled in either the master or slave pathways by the appropriate propagation of ECA bit 185 or DMA control bit Endian 134 associated with the current owner of the relevant storage access resource by the appropriate analog to or replication of RB 122.

Further, some embodiments might have a requirement for data to flow directly from Auxiliary Storage Interface 140 to Communications Interface 147 without the data going through main storage 109 first. By simply ensuring the data reaches bus 150 in "true" format (regardless of what would be done if the same data were sent to main storage 109), then it is possible for cooperating peers to use such a bus to exchange data without concern about the others' reflection. Whomever receives the data manages that issue on "their" side of the bus through the slave DMA mechanisms disclosed herein if their processing environment require such a transformation and, likewise, the other for their own master operations. Thus, the processor's requirements for data to be reflected have no bearing on how any "intelligences" in the various device interfaces may be able to communicate with each other, bypassing the processor 101 altogether.

Further, the examples above use a "multi-tasking operating system". However, it is not restricted to such a system. Simpler operating systems could also incorporate this invention.

Further, the examples above use the term "task", which should be read broadly to indicate any distinguishable stream of execution. In some systems, this might be properly called a "task", in others "a thread", in still others "a job", and doubtless many other variant terms and circumstances (such as, "executing an interrupt handler"). Thus, many entities exist in a given system with varying names and may be distinguished from each other by a variety of properties irrelevant here, but all of which can be inferred readily by those skilled in the art to be covered by the notion of "task" as used herein.

What is claimed is:

1. An apparatus for transferring data, comprising:

Direct Memory Access (DMA) logic, wherein the DMA logic connects a first bus, wherein the first bus is a memory bus, and a second bus, wherein the DMA logic comprises a reflection bias indicator, and wherein the DMA logic performs DMA data transfer between the first and second buses with reflection when the reflection bias indicator is on and performs DMA data transfer between the first and second buses without reflection when the reflection bias indicator is off; and an operating system that controls big-endian programs and little-endian programs, the big-endian programs executing as big-endian tasks and the little-endian programs executing as little-endian tasks on a task-for-task basis on a mixed-endian processor, wherein the operating system requests DMA operations of the DMA logic on behalf of the big-endian programs and the little-endian programs, and wherein the operating system further comprises a slave DMA control program that sets an endian indicator in memory, wherein the reflection bias indicator is set based on the endian indicator in memory, and wherein the memory is connected to the memory bus.

2. An apparatus for transferring data, comprising:

Direct Memory Access (DMA) logic, wherein the DMA logic connects a first bus, wherein the first bus is an I/O bus, and a second bus, wherein the DMA logic comprises a reflection bias indicator, and wherein the DMA logic performs DMA data transfer between the first and second buses with reflection when the reflection bias indicator is on and performs DMA data transfer between the first and second buses without reflection when the reflection bias indicator is off; and an operating system that controls big-endian programs and little-endian programs, the big-endian programs executing as big-endian tasks and the little-endian programs executing as little-endian tasks on a task-for-task basis on a mixed-endian processor, wherein the operating system requests DMA operations of the DMA logic on behalf of the big-endian programs and the little-endian programs, and wherein the operating system further comprises a master DMA control program that sets an endian indicator in a master DMA interface, wherein the reflection bias indicator is set based on the endian indicator in the master DMA interface, and wherein the master DMA interface is connected to the I/O bus.

3. The apparatus of claim 2, wherein the I/O bus is connected to an auxiliary storage interface.

4. The apparatus of claim 2, wherein the I/O bus is connected to a communications interface.

5. A method for transferring data, comprising:

controlling big-endian programs and little-endian programs, the big-endian programs executing as big-endian tasks and the little-endian programs executing as little-endian tasks, to execute on a task-for-task basis on a mixed-endian processor;

requesting Direct Memory Access (DMA) data transfer operations of DMA logic on behalf of the big-endian programs and the little-endian programs;

performing the DMA data transfer operations with reflection when a reflection bias indicator is on and performing DMA data transfer without reflection when the reflection bias indicator is off, wherein the DMA data transfer operations occur between a first and a second bus, wherein the first bus is an I/O bus; and setting an endian indicator in a master DMA interface, wherein the reflection bias indicator is set based on the endian indicator in the master DMA interface and wherein the master DMA interface is connected to the I/O bus.

6. The method of claim 5, wherein the I/O bus is connected to an auxiliary storage interface.

7. The method of claim 5, wherein the I/O bus is connected to a terminal interface.

8. The method of claim 5, wherein the I/O bus is connected to a communications interface.

9. A method for transferring data, comprising:

controlling big-endian programs and little-endian programs, the big-endian programs executing as big-endian tasks and the little-endian programs executing as little-endian tasks, to execute on a task-for-task basis on a mixed-endian processor;

requesting Direct Memory Access (DMA) data transfer operations of DMA logic on behalf of the big-endian programs and the little-endian programs;

performing the DMA data transfer operations with reflection when a reflection bias indicator is on and performing DMA data transfer without reflection when the reflection bias indicator is off, wherein the DMA data transfer operations occur between a first and a second bus, wherein the first bus is a memory bus; and setting an endian indicator in memory, wherein the reflection bias indicator is set based on the endian indicator in memory, and wherein the memory is connected to the memory bus.

* * * * *

UNITED STATES PATENT AND TRADEMARK OFFICE
CERTIFICATE OF CORRECTION

PATENT NO. : 5,781,763
DATED : July 14, 1998
INVENTOR(S) : Beukema, et al

It is certified that error appears in the above-identified patent and that said Letters Patent is hereby corrected as shown below:

Item 56, under Other Publications insert the following:

COMPCON Spring '93 IEEE Computer Society Int'l. Conference, 1993, "A Low-Cost Superscaler PA-RISC Processor", Patrick Knebel et al, pages 441-447.

IEEE Micro, "Multiplexed Buses: The Endian Wars Continue", David V. James, June 1990, pages 9-21.

IEEE/IEE Micro, "A Low-cost Graphics and Multimedia Workstation Chip Set",
April 1994, Vol. 14, Issue 2, pages 10-22.

Signed and Sealed this

Twenty-third Day of February, 1999

Attest:

Q. TODD DICKINSON

Attesting Officer

Acting Commissioner of Patents and Trademarks